US008522339B2

(12) United States Patent
Ohto

(10) Patent No.: US 8,522,339 B2
(45) Date of Patent: Aug. 27, 2013

(54) REPRODUCING APPARATUS, SYSTEM LSI, AND INITIALIZATION METHOD

(75) Inventor: Hidetaka Ohto, Osaka (JP)

(73) Assignee: Panasonic Corporation, Osaka (JP)

( * ) Notice: Subject to any disclaimer, the term of this patent is extended or adjusted under 35 U.S.C. 154(b) by 1076 days.

(21) Appl. No.: 12/523,379

(22) PCT Filed: Feb. 29, 2008

(86) PCT No.: PCT/JP2008/000410
§ 371 (c)(1),
(2), (4) Date: Jul. 16, 2009

(87) PCT Pub. No.: WO2008/108084
PCT Pub. Date: Sep. 12, 2008

(65) Prior Publication Data
US 2010/0031347 A1    Feb. 4, 2010

(30) Foreign Application Priority Data
Mar. 2, 2007   (JP) .................................. 2007-053162

(51) Int. Cl.
*G06F 21/00* (2013.01)
(52) U.S. Cl.
USPC ............................................... 726/19; 726/27
(58) Field of Classification Search
None
See application file for complete search history.

(56) References Cited

U.S. PATENT DOCUMENTS
6,378,013 B1 * 4/2002 Hanson .......................... 710/100
6,405,329 B1 * 6/2002 Colligan et al. ................ 714/57
6,678,812 B1 * 1/2004 Begis et al. .................... 711/171
7,659,897 B1 * 2/2010 Azar ............................... 345/501
8,307,156 B1 * 11/2012 Codilian et al. ............... 711/113
2002/0049679 A1 * 4/2002 Russell et al. ................... 705/52
2003/0088591 A1 * 5/2003 Fish ............................... 707/204
2004/0025058 A1 * 2/2004 Kuriya et al. .................. 713/201
2004/0221115 A1 * 11/2004 Sahin et al. .................... 711/154
2005/0086640 A1 4/2005 Kolehmainen et al.
2005/0210336 A1 9/2005 Russell et al.
2006/0106926 A1 5/2006 Kato et al.
2007/0099702 A1 5/2007 Tupper (Continued)

FOREIGN PATENT DOCUMENTS
GB    2423408    8/2006
JP    8-289251    11/1996

(Continued)

OTHER PUBLICATIONS

E.P.O. Office Action in European Application No. 08710513.6, mail date of Dec. 5, 2011.
English language Abstract of JP 8-289251, Nov. 1, 1996.
English language Abstract of JP 2002-99430, Apr. 5, 2002.

*Primary Examiner* — Gilberto Barron, Jr.
*Assistant Examiner* — Abdulhakim Nobahar
(74) *Attorney, Agent, or Firm* — Greenblum & Bernstein, P.L.C.

(57) ABSTRACT

Hardware of a playback apparatus includes a drive and a decoder, and firmware of the playback apparatus accesses a BD-ROM loaded on a drive, according to a BD-J application, to bring the decoder into AV playback operations. The drive unit constitutes a local storage. A benchmark score is built in the firmware in advance. The benchmark score shows a turn-around time from when a processing request is made to the hardware via the firmware to when a response returns. Such a benchmark score is written into an application data area in the local storage when the firmware is initially executed.

13 Claims, 24 Drawing Sheets

(56) References Cited

U.S. PATENT DOCUMENTS

| | | | |
|---|---|---|---|
| 2007/0226790 A1* | 9/2007 | Maher et al. | 726/18 |
| 2008/0034440 A1* | 2/2008 | Holtzman et al. | 726/27 |
| 2008/0170837 A1* | 7/2008 | Green | 386/94 |
| 2008/0225658 A1 | 9/2008 | Suguta et al. | |
| 2008/0270639 A1* | 10/2008 | Elhamias et al. | 710/16 |
| 2009/0313056 A1* | 12/2009 | Beekhuis | 705/7 |

FOREIGN PATENT DOCUMENTS

| | | |
|---|---|---|
| JP | 2002-99430 | 4/2002 |
| WO | 2005/017736 | 2/2005 |
| WO | 2005/028052 | 3/2005 |

* cited by examiner

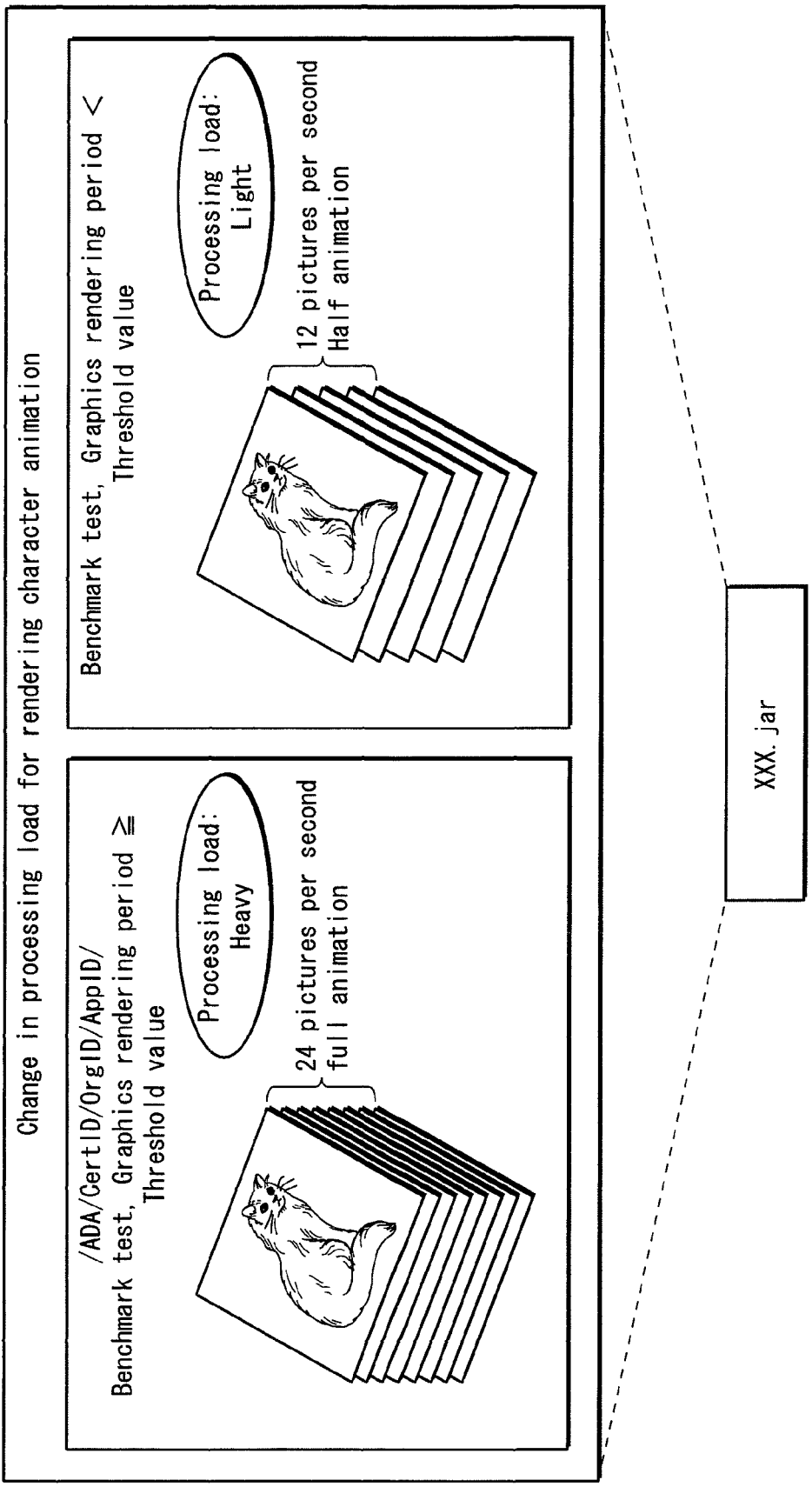

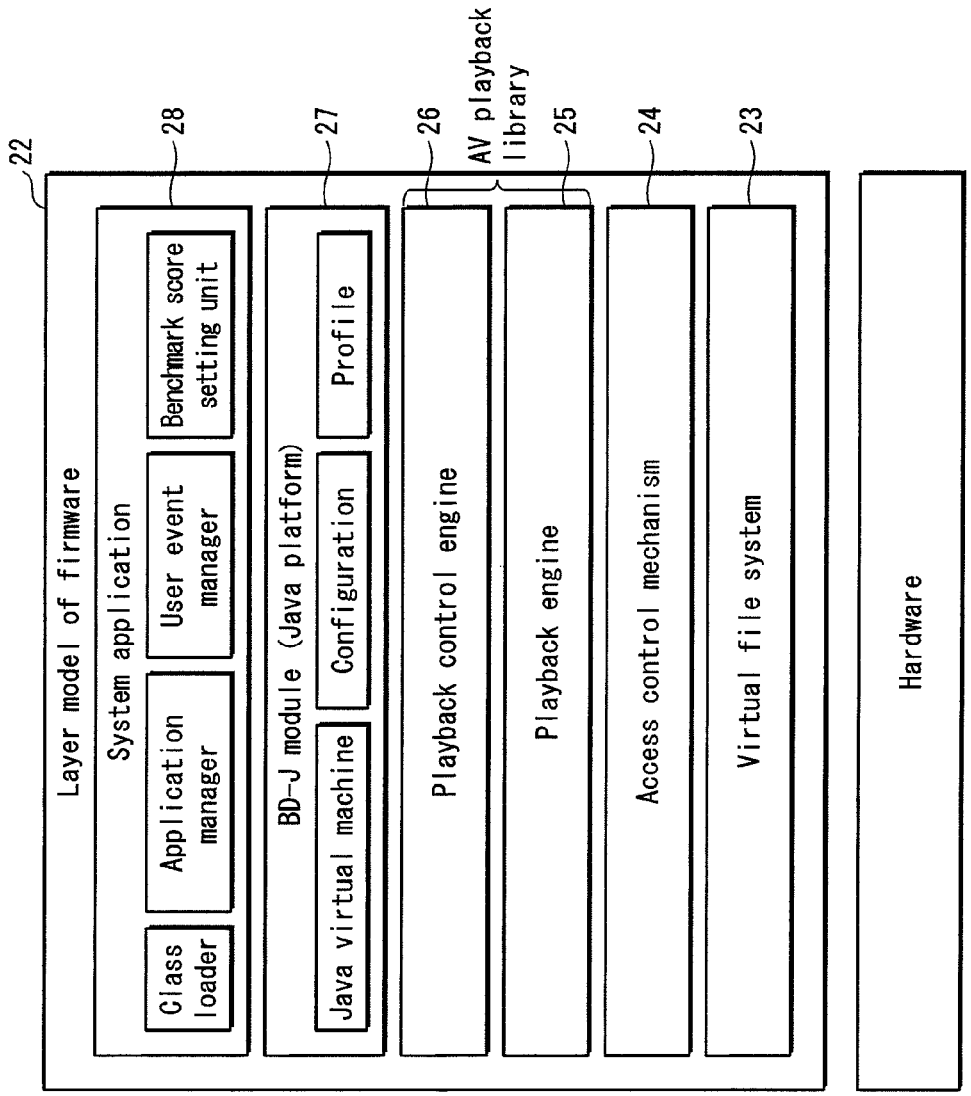
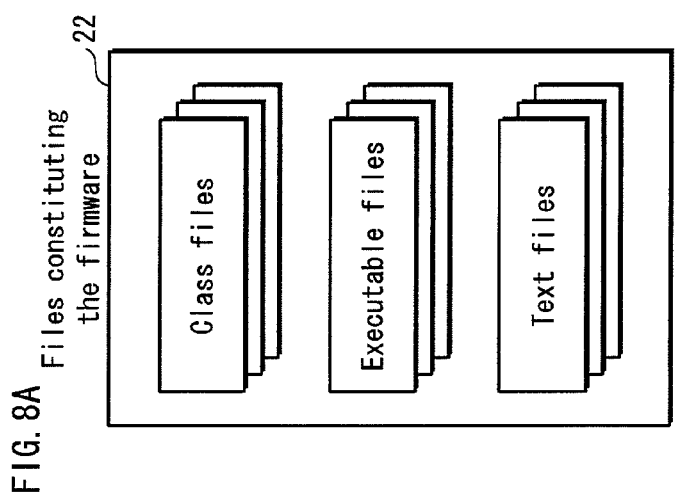

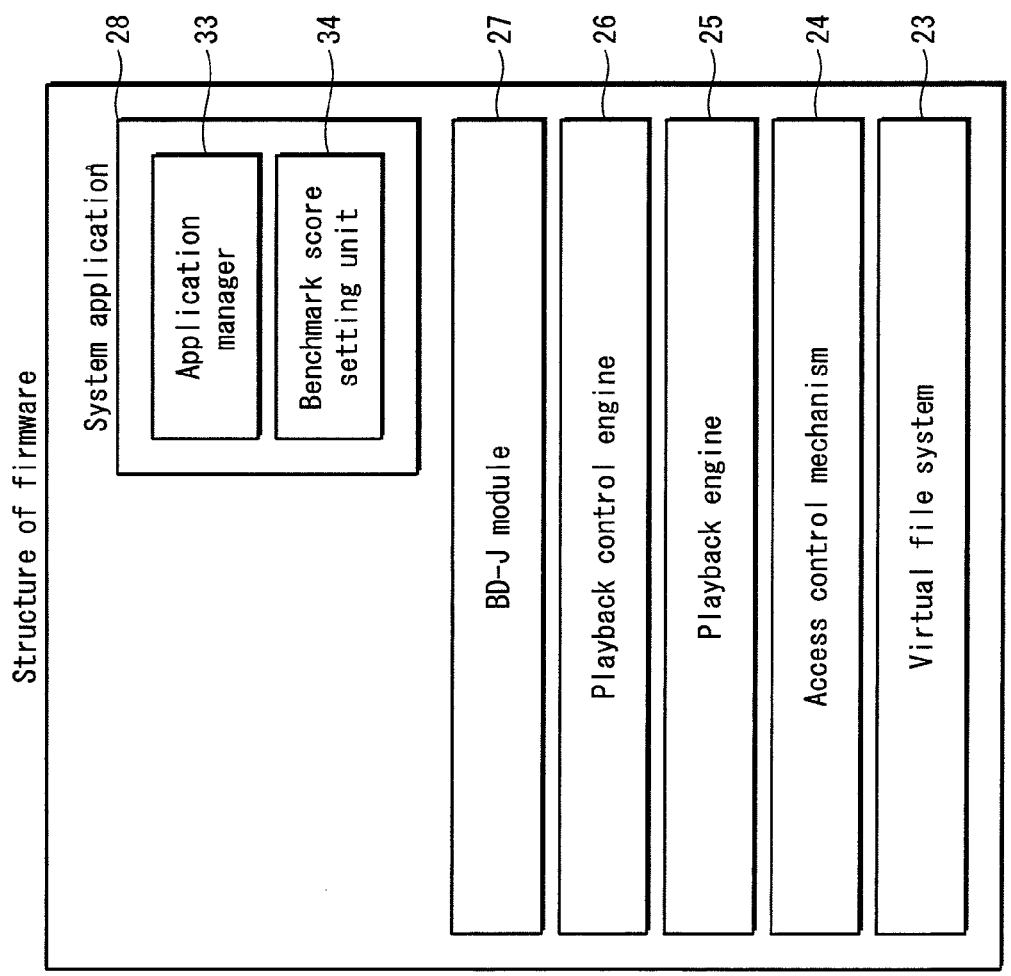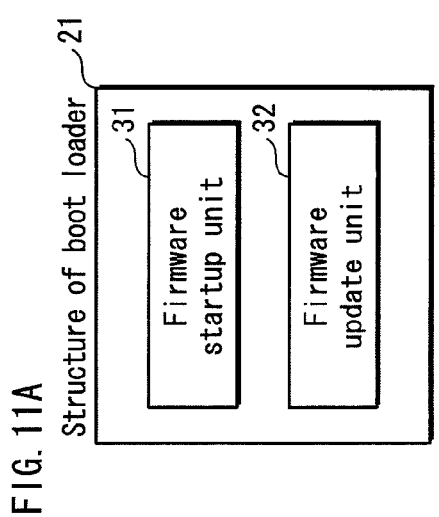

FIG. 18A

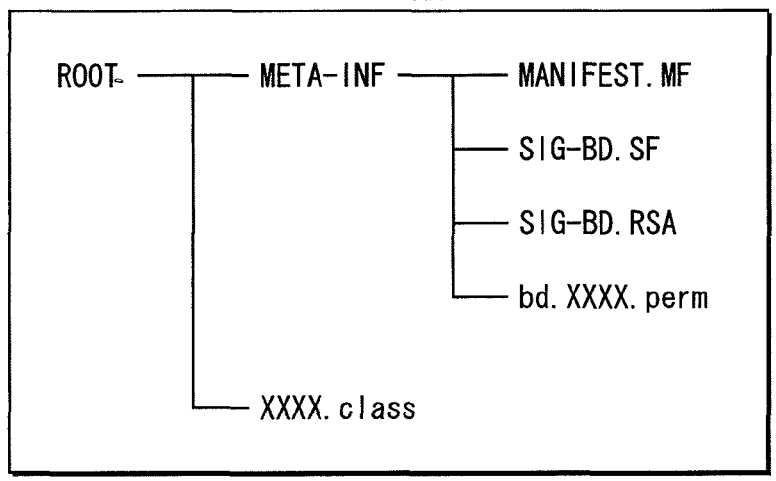

FIG. 18B

Credential of bd.xxx.perm(Credential)
| | |
|---|---|
| Hash value of provider root certificate | 51 |
| Provider organization ID | 52 |
| Hash value of recipient root certificate | 53 |
| Recipient organization ID | 54 |
| Recipient application ID | 55 |
| Provided file list | 56 |
|   Benchmark score name | 57 |
|   Provided access method | 58 |
|   Provided access method | |
|   Provided access method | |

FIG. 18C

| |
|---|
| 96:9E:10:F7:38:53:51:E1:BD:E8:A8:D1:BA:60:10:94 |
| "4" |
| 42:6C:40:25:2C:4B:04:9D:20:E7:45:97:02:D2:01:08 |
| "7" |
| "8" |
| "4/5/scores.txt" |
| "read" |
| "4/5/scores2.txt" |
| "read", "write" |

REPRODUCING APPARATUS, SYSTEM LSI, AND INITIALIZATION METHOD

TECHNICAL FIELD

The present invention belongs to a technical field of an application execution technique.

BACKGROUND ART

The application execution technique is a technique to cause a virtual machine to execute an application program described in an object-oriented language. This is realized through generation of a class object from a class structure described in an object-oriented language, and providing of the class object to a platform of the virtual machine. The class object is an instance of the class structure. Industrial products as applications of the technique include, for example, playback apparatuses that have a Bluray Disc-Read Only Memory (BD-ROM) playback function.

Such playback apparatuses are developed by various manufacturing enterprises (called manufacturers), and remodeled almost every year. Accordingly, the playback apparatuses have different microprocessor units (MPUs), memory sizes, bus band widths and hardware parts such as graphic accelerator, and the application processing speeds of the playback apparatuses vary widely due to the differences.

Since the apparatuses are different in performance from each other, it is necessary to change the processing load when the application programs run. For example, the number of images of animation for a graphical user interface (GUI) should be increased or decreased. Since a playback apparatus equipped with high-performance hardware is capable of loading and expanding graphics data for GUI at a high speed, the number of the animation images should be increased. On the other hand, for a playback apparatus equipped with low-performance hardware, the number of the animation images should be decreased. Through such an adjustment of the number of images, it is possible to maintain the speed of responses to user's operations at a certain level without being influenced by the hardware performance differences. To realize such an adjustment of the processing load, it is necessary for application programs to estimate the performance of the hardware as the subject of the execution. For this purpose, when started up, applications may firstly execute a benchmark test for estimating the performance.

Patent Document 1 discloses an example method for such changing of the processing load with use of a benchmark test.
Patent Document 1: Japanese Laid-open Patent Application Publication No. 2002-99430

DISCLOSURE OF THE INVENTION

Problems To Be Solved By the Invention

By the way, BD-ROM playback apparatuses have a variety of functions. Accordingly, it is necessary to conduct a benchmark test on many hardware processing procedures to change the processing load on BD-ROM playback apparatuses. If such a benchmark test on the variety of functions is performed before the execution of the application program, a delay time from the startup of the application by the user to the actual start of the processing (i.e. starting delay) will be long, because it takes a very long time to complete the benchmark test.

To solve this problem, the first method that comes to mind is reuse of benchmark results. Specifically, a benchmark test is performed on the application that has been officially authorized by a standards promotion group of playback apparatuses, the results of the test is written into a storage, and other applications use the results. Since the benchmark test is performed on the authorized application, other applications can reuse the results without performing the test, and reduce the starting delay for each application. If the benchmark test on the authorized application covers many of the required functions, precise load adjustment can be realized.

However, a firmware program, which intervenes between hardware and applications, is updated irregularly. A firmware program is a type of software that is built into apparatuses to perform basic controls of hardware. Even if the benchmark test on the authorized application covers many of the required functions, the results are useless if the target of the benchmark test is an old firmware program. This is because the speed of execution of the functions largely depends on the overhead of the firmware program. Also, the functions of the playback apparatuses might change when the calculation algorithms are changed.

In this way, it is problematic that if benchmark test that covers many of functions are performed before execution of applications, a large delay might occur before the execution of the original processing procedures. Also, in the case of reusing the results of benchmark test performed on the authorized application, the results of the benchmark test might not be effective after an irregular update of the firmware occurs.

The object of the present invention is to provide a playback apparatus that enables applications to reuse the results of benchmark test that covers many functions, while eliminating the delay at the startup of the application.

Means For Solving the Problems

To solve the problems explained above, the present invention provides a playback apparatus comprising: a hardware part that includes (i) a drive unit operable to read data including a benchmark program and audiovisual (AV) data from a recording medium, (ii) a playback unit operable to play back the AV data, and (iii) a processing unit operable to execute a program; a firmware program for use in control of the hardware part; an initializer operable to perform initialization when the processing unit executes the firmware program; and a storage having a recording area, wherein a benchmark score is included in the firmware program, the benchmark score indicates processing capability of the hardware part and is a result of prescribed processing that the hardware part executes according to an instruction received from the benchmark program via the firmware program, and at initial execution of the firmware program by the processing unit, the initializer enables an application program to access the benchmark score by writing the benchmark score into the recording area of the storage.

Advantageous Effects of the Present Invention

With the stated structure, the initializer writes the benchmark score in the recording area in the storage at the initial execution of the firmware to prevent the starting delay of the application. Although a delay is caused by the writing of the benchmark score into the recording area at the initial execution of the firmware, no delay is caused at the startup of the application. Thus, the starting delay at the startup of the application does not occur.

In this way, by eliminating the effect of the starting delay, it is possible to provide quick response to the user's operations.

It is unnecessary for the application to execute the benchmark test by itself. Instead, the application acquires information relating to the hardware parts of the playback apparatus from the benchmark score written in the recording area of the storage. Thus, it is possible to shorten the time required for the application's operations by the time required for the benchmark test.

Here, in the case the benchmark score is built in the firmware, there is a possibility that the application destroys the firmware by directly accessing the benchmark score in the firmware. To prevent the application from destroying the firmware, the initializer writes the benchmark score in the application data area before the application starts up.

This prevents the benchmark score built in the firmware of the playback apparatus from being directly accessed by the application. As a result, it is possible to prevent the destroying of the firmware (or a recording medium that stores the firmware, such as a memory) due to unnecessary accesses by the application, and exposure of the firmware.

Further, the writing of the benchmark score is performed at the initial execution of the firmware, not at every startup of the firmware. The number of times the writing of the benchmark score is performed is therefore considerably reduced compared to the case of writing the benchmark score at every startup of the firmware.

Also, as the application uses this benchmark score, it is possible to more precisely determine the load of the rendering of animations on the playback apparatus. Thus, it is possible to allow the playback apparatus to perform necessary processing with a suitable load level according to the hardware performance.

In a case where the firmware program is updated, the initializer may write the benchmark score included in the updated firmware program into the recording area when the processing unit initially executes the updated firmware program.

The benchmark score is built in the firmware included in the playback apparatus. Thus, as the old firmware is overwritten with the new firmware at the updating of the firmware, the benchmark score is updated accordingly. Moreover, at the initial execution of the new firmware program, the benchmark score written in the recording area in the storage is updated as well.

The benchmark score in the playback apparatus is updated together with the firmware when the firmware is updated from the old version to the new version. Thus, even if the firmware is updated irregularly, the version confliction, which is inconsistency between the version number of the firmware and the version number of the benchmark score, does not happen. In other words, even if the firmware is updated irregularly, it is possible to maintain the validity of the benchmark score.

The writing of the benchmark score is performed at the initial execution of the firmware after the updating of the firmware by the user, instead of at every startup of the firmware. The number of times the writing of the benchmark score is performed is therefore considerably reduced compared to the case of writing the benchmark score at every startup of the firmware. Although a delay is caused by the writing of the benchmark score into the recording area at the initial execution of the firmware, no delay is caused at the startup of the application. Thus, the starting delay at the startup of the application does not occur. In this way, by eliminating the effect of the starting delay, it is possible to provide quick response to the user's operations.

The playback apparatus may further comprise a judgment unit operable, when an application program makes a request to access the benchmark score written in the recording area, to judge validity of a credential corresponding to the application program, and if the credential is valid, further judge whether to permit the application program to access the benchmark score according to access right information of the application program, which is included in the credential.

With the stated structure, it becomes possible to check whether the application that makes a request to read the benchmark score has a valid right to access the benchmark score. Moreover, since the checking is performed with use of the digital signature technology, it is possible to realize the mechanism for the judgment of the right without any major modification to the standard model of the Blu-ray Disc Java (BD-J) application terminal.

The recording area may be identified by a file path that includes an identifier of a provider of the benchmark program and an identifier of the benchmark program.

For example, the benchmark test with use of an authorized application is performed according to the standard defined by a standards promotion group, the benchmark scores will be highly reliable meaningful information. However, as the reliability is high, if it is possible to use the benchmark score unlimitedly, the benchmark score can be used for undermining the credibility of the playback apparatus (so called "negative campaign") by, for example, publicizing the score on a Web page. To prevent such a negative campaign, the stated structure allows only applications that have been given the access right, authorized by the provider of the benchmark program, to read the benchmark score. For example, the stated structure allows only applications that have been authorized by the organization promoting standardization of recording media to read the benchmark score. As a result, the manufacturer can safely build the benchmark score into the firmware and allow applications to use the score.

The firmware program may include an input/output (I/O) program that returns the benchmark score to the application program in response to an access request from the application program, and when the application program makes the access request with designation of the file path of the benchmark score, the I/O program may return the benchmark score based on the designation of the file path.

With the stated structure, since the application uses such a benchmark score, it is possible to more precisely determine the load for rendering animations on the playback apparatus. Thus, it is possible to allow the playback apparatus to perform necessary processing with a suitable load level according to the hardware performance. Further, it is possible to prevent the application from directly accessing the benchmark score.

In a case where the benchmark score included in the firmware program is loaded into the second recording area, the I/O program may generate positional information that includes information of a file path of an original recording position of the benchmark score in the storage and information of an actual recording position in the second recording area into which the benchmark score is loaded, and on receipt of the designation of the file path from the application program, the I/O program may refer to the positional information, read the benchmark score loaded in the second recording area, and return the benchmark score to the application program.

With the stated structure, the application can acquire the benchmark score without knowing the actual recording position of the benchmark score.

The initializer may judge whether the recording area identified by the file path stores the benchmark score, and if the recording area does not store the benchmark score, the initializer may write the benchmark score into the recording area identified by the file path.

With the stated structure, even if the benchmark score in the recording area determined by the path is overwritten and deleted accidentally, checking on whether the benchmark score has been deleted is performed when the firmware is started up. If the benchmark score has been deleted, the benchmark score will be read from the firmware again, and be written in the recording area in the storage. Thus, at the startup of the firmware, it is possible to check whether the benchmark score has been deleted and prepare for the case of such deletion. As a result, the playback apparatus can promptly respond to the request from the application to read the benchmark score.

In a case where the firmware program is updated, the initializer may compare a version of the benchmark score incorporated in the updated firmware program with a version of the benchmark score stored in the recording area, and if the version of the benchmark score incorporated in the updated firmware program is newer than the other, the initializer may write the benchmark score included in the updated firmware into the recording area that is identified by the file path.

With the stated structure, in the case no change has been made to the benchmark score included in the firmware even after the firmware is updated (i.e. the version of the benchmark score after the updating is the same as the benchmark score before the updating), the writing of the benchmark score into the recording area in the storage, indicated by the file path, can be suppressed. Thus, for example, in the case where the recording area is a memory area on a semiconductor memory card that has a limitation on the number of writings to the recording area, the stated structure extends the operating life of the semiconductor memory card.

In addition to the method of writing the benchmark score into the application data area, there is another way to provide the application with the benchmark score. For this purpose, the initializer may be structured as follows.

Namely, the benchmark score may be loaded in the memory so that the application can use the benchmark score. With the stated structure, it is possible to reduce the delay time caused by the copying of the benchmark score into the application data area in the local storage. Also, in the case the application data area is structured from the semiconductor memory card, it is possible to reduce the number of writings into the semiconductor memory card.

BRIEF DESCRIPTION OF THE DRAWINGS

FIG. 6 shows processing performed by an application provided via a BD-ROM to display a resultant video;

FIG. 8A shows a file group constituting a firmware program;

FIG. 8B is a layer model showing controls performed by the playback apparatus;

FIG. 11A shows an internal structure of a boot loader 21;

FIG. 11B shows a flag indicating whether the execution is the first execution;

FIG. 11C shows an internal structure of a system application 28;

FIG. 18A shows an example structure of a Java™ archive file 302;

FIG. 18B shows an example data structure of a digital credential;

FIG. 18C shows a specific example of a digital credential;

EXPLANATION OF REFERENCES

Figure 1:
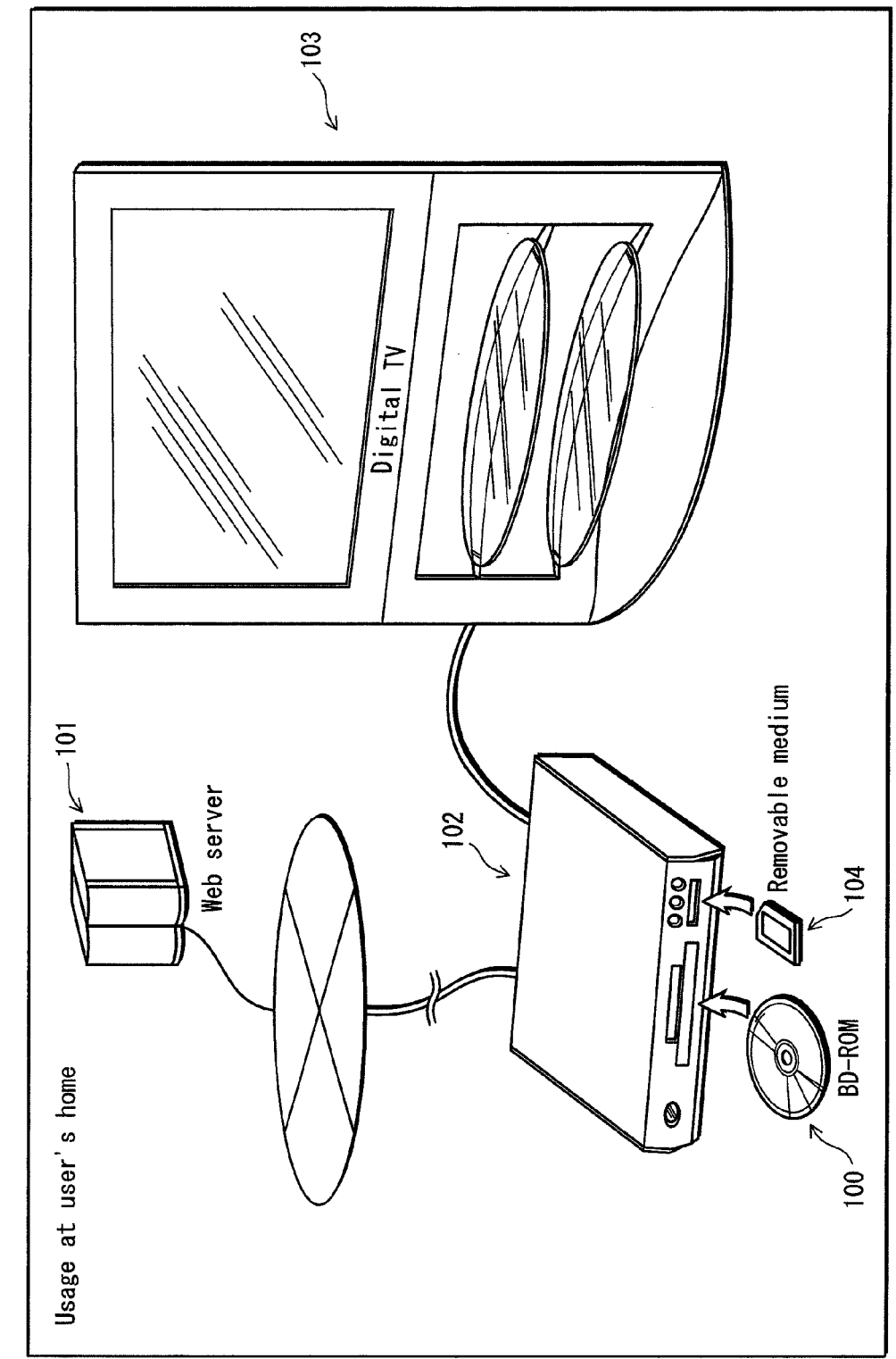
FIG. 1 shows a utilization example of a playback apparatus 102 installed in a user's house.

100 BD-ROM
101 WWW server
102 playback apparatus
103 TV
104 removable medium
105 development computer
21 boot loader
22 firmware
23 virtual file system
24 access control mechanism
25 playback engine
26 playback control engine
27 BD-J module
28 system application
29 benchmark application
31 firmware startup unit
32 firmware update unit
33 application manager
34 benchmark score setting unit

BEST MODE FOR CARRYING OUT THE INVENTION

First Embodiment

The following explains an embodiment of the present invention, with reference to the drawings.

The following explains an embodiment of a playback apparatus. First of all, among various acts of practicing a playback apparatus of the present invention, an act of using is described. FIG. 1 shows a utilization example of a playback apparatus 102 installed in a user's house. As FIG. 1 shows, the playback apparatus 102 is provided to be used by the user, together with a BD-ROM 100, a WWW server 101 (also called a Web server), a TV 103 and a removable medium 104.

The BD-ROM 100 is a recording medium on which a movie work has been recorded.

The WWW server 101 is a server apparatus for managing an official website of the provider of the movie work. The WWW server 101 provides the user with contents that realize partial replacement of or addition to the movie work recorded on the BD-ROM 100, via the Internet or the like.

The playback apparatus 102 constitutes a home theater system together with the TV 103 and so on, and plays the BD-ROM 100.

The TV 103 displays a played video of the movie work, a menu, and so on, in order to provide the user with an interactive operational environment.

The removable medium 104 is to be coupled to the playback apparatus 102, and is to be used for storing contents distributed from the WWW server 101 of the movie provider. Thus, it is possible to expand/update the contents recorded on the BD-ROM 100 by combining them with the contents downloaded from the WWW server 101 via the Internet and stored in the removable medium 104. In order to load such a removable medium 104, the playback apparatus 102 is equipped with a loading slot for loading a removable medium 104 which is a representative of a SD memory card, a memory stick, a Compact Flash™, a smart media, a multimedia card, and so on.

This concludes the description of the act of using the playback apparatus 102 of the present invention. The following explains the recording medium that is a playback target of the playback apparatus 102 pertaining to the present invention. The recording medium to be played back by the playback apparatus 102 pertaining to the present invention is the BD-ROM 100, which is an optical recording medium.

Figure 2:
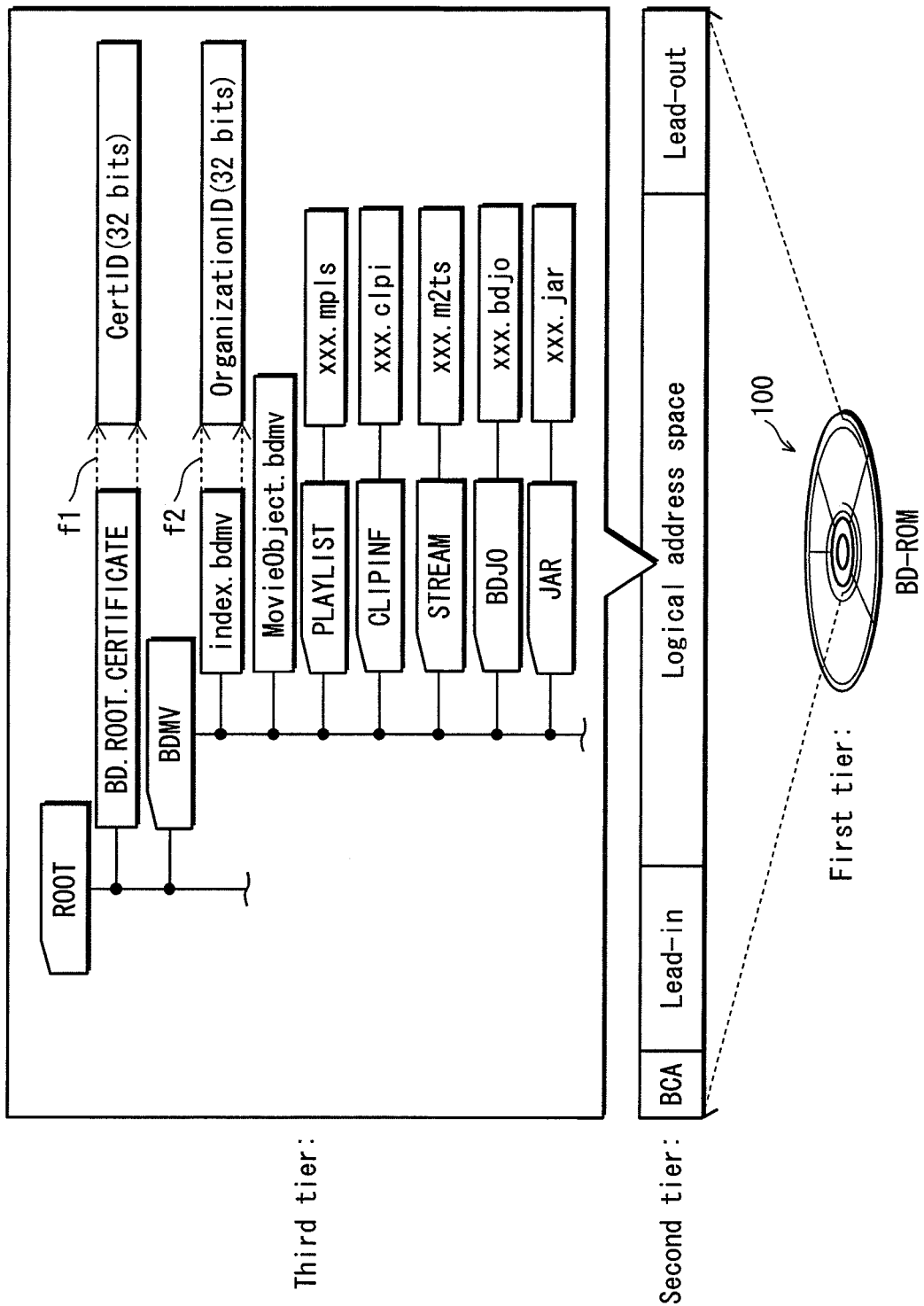
FIG. 2 shows the structure of a BD-ROM.

FIG. 2 shows the structure of a BD-ROM (hereinafter also called as "BD"). The BD-ROM 100 is shown at the first tier in FIG. 2, while a track on the BD-ROM 100 is shown at the second tier. The track depicted in FIG. 2 results from a track spiraling from the inner circumference to the outer circumference of the BD-ROM 100 having been drawn out to the sides. As the second tier shows, the recording area includes a "lead-in" at the inner radius, a "lead-out" at the outer radius, and a "logical address space". Also, a special area called a BCA (Burst Cutting Area) which can only be read by a drive is provided on the inner side of the lead-in. Since this area cannot be read from an application, it is often applied in copyright protection technology, for instance.

The "logical address space" stores therein various types of video data following area management information for a file system. The "file system" is, for example, UDF and ISO 9660. Extension 2.3 format is adopted in the present embodiment.

The third tier in FIG. 2 shows the directory/file structure that has been built based on the file system shown in the second tier. As shown in FIG. 2, a BD.ROOT.CERTIFICATE and a Blu-ray Disc Movie (BDMV) directory are placed directly below a ROOT directory (ROOT) of the BD-ROM.

The BD.ROOT.CERTIFICATE (the disc root certificate) is encoded in, for example, the X.509 format. The detailed specifications of X.509 are recited in CCITT Recommendation X.509 (1988), "The Directory—Authentication Framework" issued from the International Telegraph and Telephone Consultative Committee. The lead line f1 in FIG. 2 indicates the usage of the BD.ROOT.CERTIFICATE. As indicated by this lead line, the BD.ROOT.CERTIFICATE is used for the purpose of extracting an ID (called "Cert ID") unique to the certificate.

The BDMV directory is a directory in which data that can be stored in the BD-ROM, such as AV contents and management information, are recorded. Under the BDMV directory, five sub directories (a PLAYLIST directory, a CLIPINF directory, a STREAM directory, a BDJA directory, and a JAR directory) exist. Also, two types of files (index.bdmv and Movieobject.bdmv) exist under the BDMV directory.

The STREAM directory stores files forming the main digital stream. Files with the extension "mt2s" (xxx.m2ts, where "xxx" is variable and extension "mt2s" is fixed) exist under the STREAM directory.

Files with the extension "mpls" (xxx.mpls, where "xxx" is variable and extension "mpls" is fixed) exist under the PLAYLIST directory.

Files with the extension "clip" (xxx.clpi, where "xxx" is variable and extension "clip" is fixed) exist under the CLIPINF directory.

Files with the extension "jar" (xxx.jar, where "xxx" is variable and extension "jar" is fixed) exist under the JAR directory.

Files with the extension "bdjo" (xxx.jar, where "xxx" is variable and extension "bdjo" is fixed) exist under the BDJO directory.

<Files With Extension "mt2s">

The files with the extension "m2ts" are digital AV streams in the MPEG-TS format ("TS" stands for Transport Stream) each of which is obtained by multiplexing a video stream, one or more audio streams and one or more graphics streams. The video stream represents the video part of the movie; the audio stream represents the audio part of the movie; and the graphics stream represents the subtitle of the movie.

The files with the extension "clip" are management information called Clip information which correspond to the digital AV streams on a one-to-one basis. The Clip information, being management information, contains information such as the encoding format, frame rate, bit rate and resolution of the digital AV stream, and EP_map that indicates starting positions of GOPs.

<Files With Extension "mpls">

The files with the extension "mpls" store therein PlayList (PL) information. The PlayList information includes MainPath information, Subpath information, and PlayListMark information.

1) The MainPath information is information that defines a logical playback section by defining one or more combinations of In_Time and Out_Time which are time points on a playback time axis of an AV stream. The MainPath information includes a stream number table and STN_table, where the stream number table indicates which elementary streams among those multiplexed in the AV stream are validated to be played back. With the STN_table, it is possible to define which elementary streams among those multiplexed in the AV stream are permitted to be played back and which elementary streams are not permitted to be played back.

2) The PlayListMark information includes specification of a time point at which a chapter starts, within a part of the AV stream that is specified by a combination of In_Time and Out_Time.

3) The Subpath information includes specification of an elementary stream that is to be played back in synchronization with the AV stream, and one or more combination of In_Time and Out_Time which are time points on a playback time axis of the elementary stream. An AV playback is started when a Java™ application instructs a Java™ virtual machine to generate a JMF player instance for playing back the piece of PlayList information. The JMF player instance is actual data that is generated on a heap memory of the virtual machine based on the JMF player class.

The combination of the AV stream and the PlayList information constitutes a playback unit called "Title". The AV playback in the BD-ROM is performed in the unit of Title.

<Files With Extension "jar">

The files with the extension "jar" are Java™ archive files in which exist class files of Java™ applications for performing dynamic scenario control using the Java™ virtual machine. The Java™ applications defined by the class files are Java™ Xlets that are controlled via an Xlet interface. The Xlet interface provides four states: "loaded", "paused", "active", and "destroyed". The applications mentioned in the present description are instances for class files recorded on a recording medium such as BD-ROM.

<Files With Extension "bdjo">

The files with the extension "bdjo" are files storing BD-J Objects. The BD-J Object is information that defines a Title by a relationship between an AV stream indicated by the PlayList information and an application. The BD-J Object includes "application management table" and a list of Play-Lists that can be played back in the Title. The application management table (AMT) is a table that is used to achieve "application signaling", where the application signaling is a control that manages the "Title" in the BD-ROM as a life cycle of the application and takes charge of the start and end of the application. It should be noted here that the life cycle means a cycle during which an application lives on the heap memory of the virtual machine on a time axis of the entire content recorded on the BD-ROM. Here, the term "live" refers to the state where the application has been read out onto the heap memory such that the application can be executed by the virtual machine. The application management table indicates an application whose life cycle is the Title by showing the identifier of the application (application ID) and the IDs of the Java™ archive files that belong to the application. That is to say, one application is constituted by one or more Java™ archive files.

A Java™ application whose controls are defined by the application management table in the BD-J Object is called a "BD-J application".

<Index.bdmv (Fixed File Name)>

The index.bdmv (fixed file name) is management information regarding the BD-ROM as a whole. After a BD-ROM is inserted into the playback apparatus 102, the index.bdmv is read first so that the disc is recognized uniquely by the playback apparatus 102. In addition to this, the index.bdmv includes a table that shows relationships between a plurality of playable Titles in the BD-ROM and BD-J Objects respectively defining the playable Titles. The lead line f2 in FIG. 2 indicates the close-up of the internal structure of index.bdmv. As indicated by the lead line f2, the index.bdmv includes information such as an Organization ID (32 bits) that is an identifier of the provider of the movie work.

<MovieObject.bdmv (Fixed File Name)>

The MovieObject.bdmv (fixed file name) includes a scenario program in which a scenario is written, the scenario being used to dynamically change the progress of the playback of each Title when it is played back in the HDMV mode (which will be described later).

Figure 3:
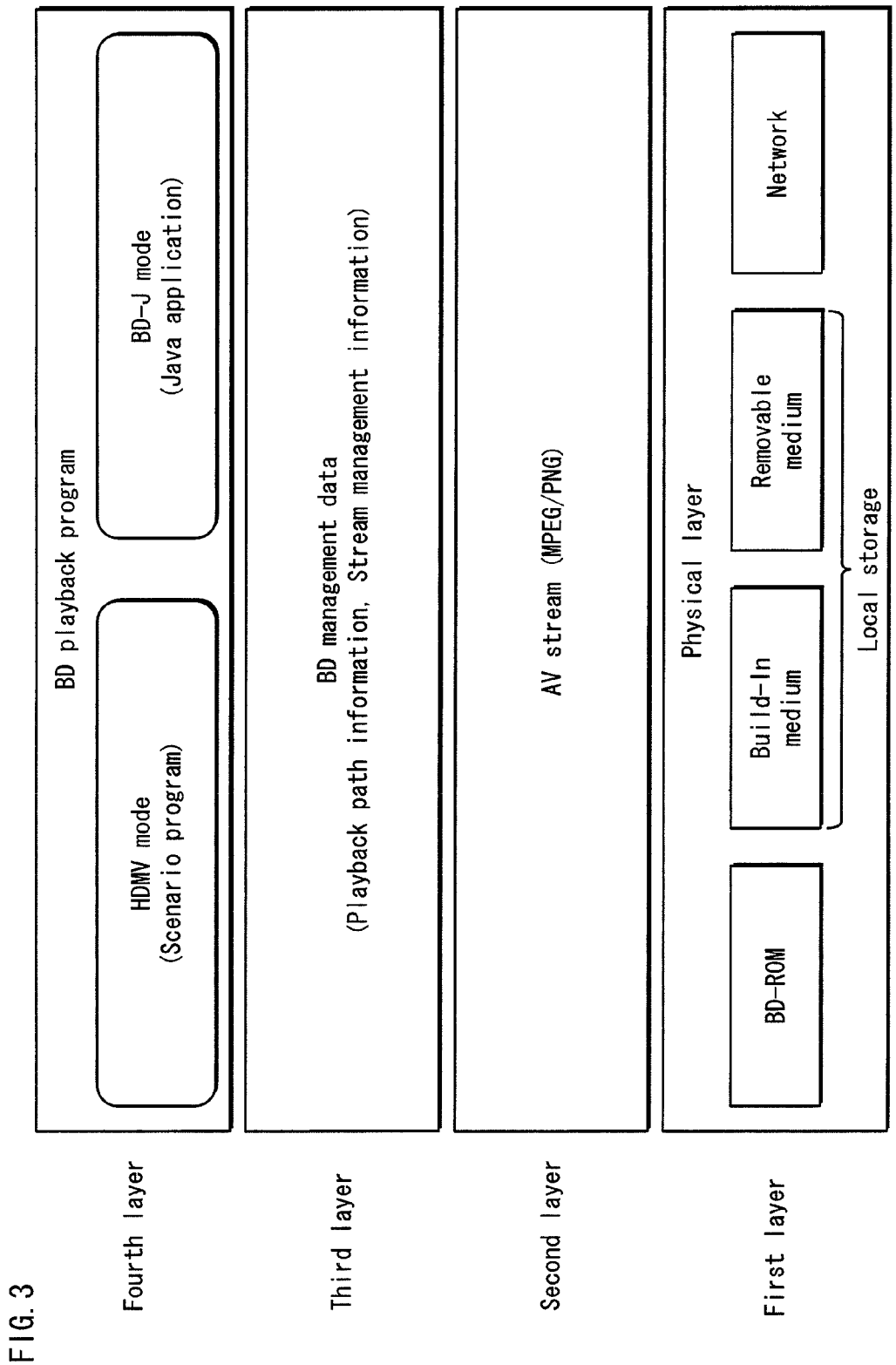
FIG. 3 shows a layer model for playback control of a BD-ROM.

FIG. 3 shows a layer model for the playback control. The first layer from bottom of FIG. 3 shows a physical layer that controls supply of the substantial body of the stream to be processed. As shown in the first layer, in addition to the BD-ROM, there are various recording mediums and communication mediums such as a built-in medium, a removable medium, and a network that can be the supply sources. Here, the built-in medium means a recording medium that is preliminarily built in the playback apparatus 102, such as an HDD (Hard Disk Drive). The removable medium means a portable recording medium such as an SD memory card, a memory stick, a Compact Flash™, a SmartMedia™, and a multimedia card. The built-in mediums and the removable mediums are recording mediums that are used locally by the playback apparatus 102, and are generically called "local storages". The control achieved by the first layer is a control (disk access, card access, network communication) on the supply sources such as the local storages and the network.

The second layer is a layer of the AV stream. The second layer defines what decoding method is used to decode the stream supplied by the first layer.

The third layer (BD management data) is a layer that defines a static scenario of the stream. The static scenario includes the playback path information and the stream management information that are preliminarily defined by the disc creator. The third layer defines a playback control based on the information.

The fourth layer (BD playback program) is a layer that defines a dynamic scenario of the stream. The dynamic scenario is a program that executes at least one of: a playback procedure of the AV stream; and a control procedure regarding the playback. The playback control by the dynamic scenario varies depending on the user operation made onto the apparatus, and has a characteristic of a program. The dynamic playback control here has two modes.

Figure 4:
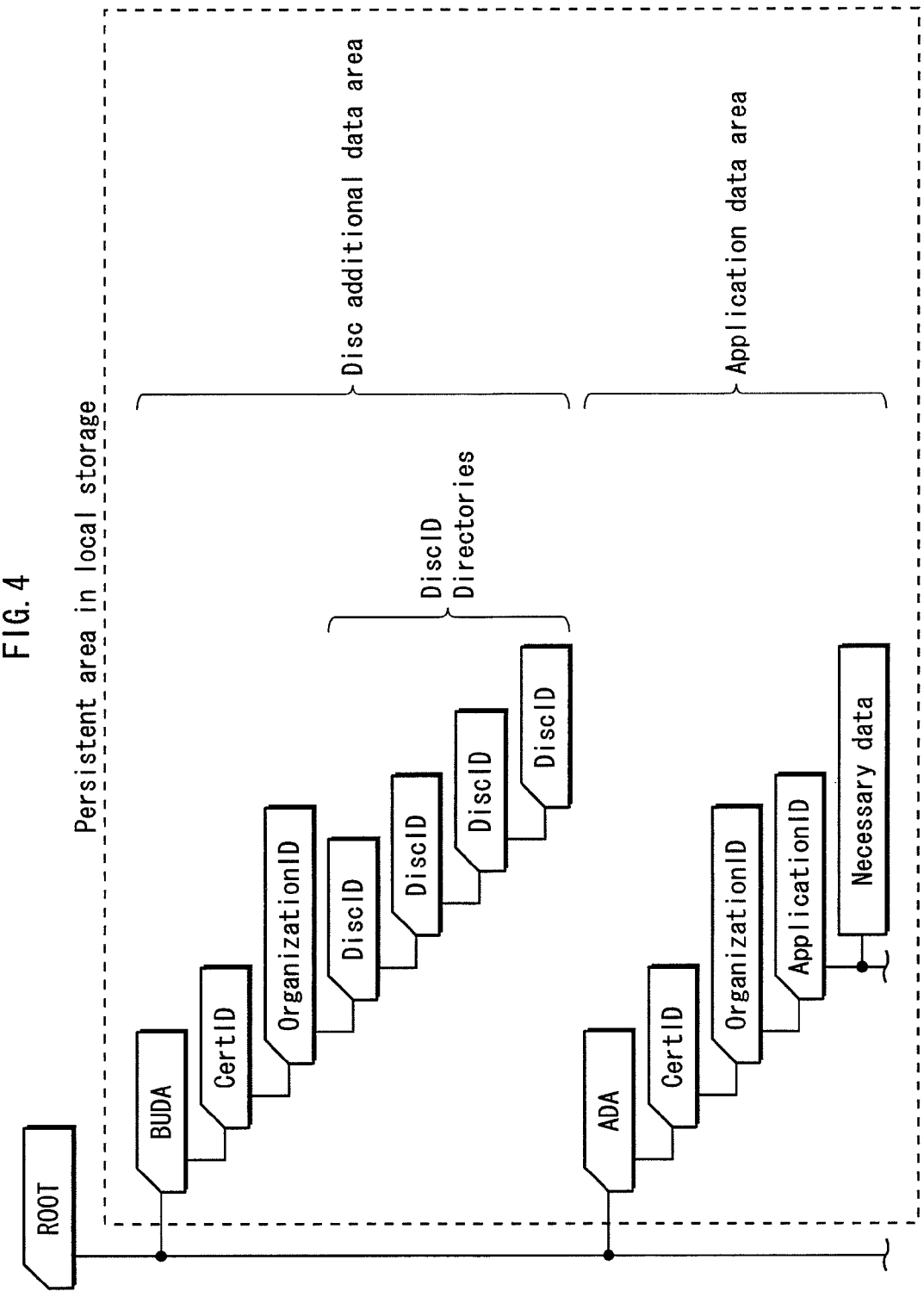
FIG. 4 shows an internal structure of a persistent area in a local storage.

The following explains the internal structure of the local storage. The local storage includes a persistent area that has the directory/file structure shown in FIG. 4. FIG. 4 shows the internal structure of the persistent area in the local storage.

The persistent area includes "disc additional data area" and "application data area".

The "disc additional data area" is an area corresponding to each of BD-ROMs with which the playback apparatus 102 was loaded in the past. The disc additional data area stores therein additional data to the contents of each BD-ROM. The disc additional data area includes "BUDA directory", "Cert ID directory", "Organization ID directory" and "Disc ID directories".

The "BUDA directory" is located immediately under the root directory of the local storage, for example. The BUDA directory indicates the root of the additional content area. The directory name is a fixed value (BD_BUDA) composed of eight or less characters.

The "Cert ID directory" is a directory whose name is an ID obtained from the BD.ROOT.CERTIFICATE on the BD-ROM, for example. The name is composed of eight characters in hexadecimal notation represented by the first 32 bits of 160 bits which represent the SHA-1 digest value of the BD.ROOT.CERTIFICATE.

The "Organization ID directory" is a directory whose name is composed of eight characters in hexadecimal notation represented by a 32-bit identifier (Organization ID) identifying the provider of the movie work. The Organization ID is written in the BD management information (index.bdmv) on the BD-ROM, for example.

The "Disc ID directories" are composed of four directories, for example. Each of the four directories is assigned with a directory name that is represented in hexadecimal notation and composed of eight characters. The names of these four directories can be obtained by dividing the Disc ID, which is consisted of 128 bits and identifies the BD-ROM, into four sets of 32 bits in order from the head of the Disc ID.

The "application data area" is an area for storing data required by the application to operate, for example. The application data area stores therein user configurations, cookies, game scores, passwords and so on, which are required by the application to operate.

The application data area includes an ADA (Application Data Area) directory, a Cert ID directory, an Organization ID directory, and an Application ID directory.

The application data area directory (ADA directory) is located immediately under the root directory of the local storage, and indicates the root of the application data area. The directory name is a fixed value (ADA).

The "Cert ID directory" is a directory whose name is an ID obtained from the BD.ROOT.CERTIFICATE on the BD-ROM. The name is composed of eight characters in hexadecimal notation represented by the first 32 bits of 160 bits which represent the SHA-1 digest value of the BD.ROOT.CERTIFICATE.

The "Organization ID directory" is a directory whose name is composed of eight characters in hexadecimal notation represented by a 32-bit identifier (Organization ID) identifying the provider of the movie work. The Organization ID is written in the index.bdmv on the BD-ROM.

The "Application ID directory" is a directory whose name is a 32-bit identifier (Application ID) of an application represented in hexadecimal notation. The Application ID is used as a file name of an archive file. The Application ID directory stores therein a text file that includes a benchmark score.

The text file is stored in the application data area. The application data area can be identified by a fixed file path, which is a combination "ADA-Cert ID-Organization ID-Application ID". Thus, the BD-J application can read the benchmark score via the API (Java I/O method) for file I/O.

Figure 5A:
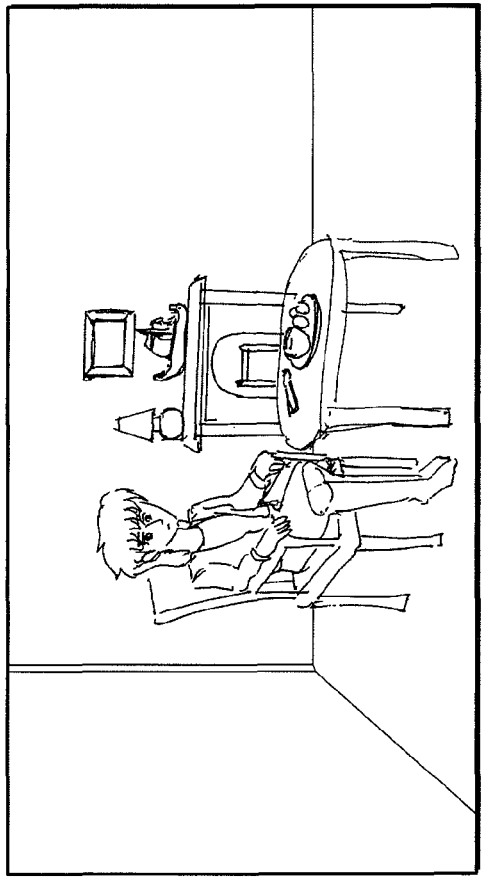
FIG. 5A shows a scene of a movie work generated based on definition of a dynamic playback control in an High Definition Movie (HDMV) mode.
Figure 5B:
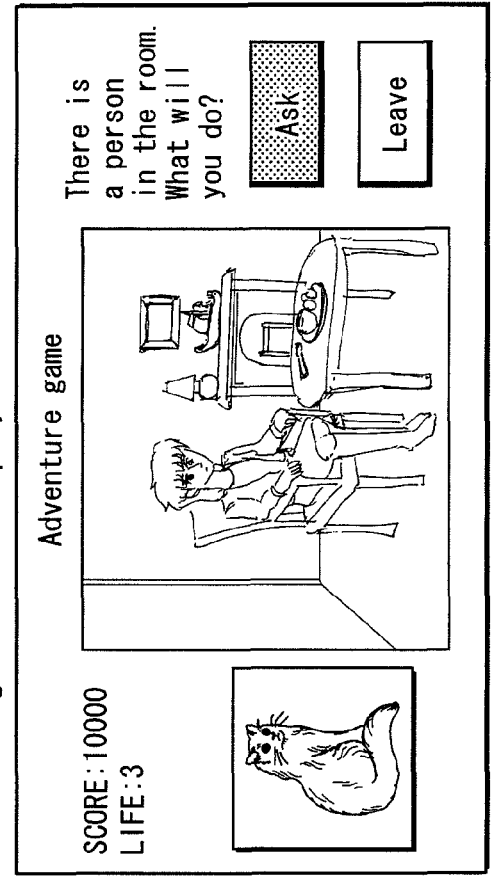
FIG. 5B shows a movie work generated based on definition of a dynamic playback control in a BD-J mode.

FIGS. 5A and 5B show a movie work created by the dynamic playback control in two modes. FIG. 5A shows a scene of the movie work that is created by defining the dynamic playback control in the HDMV mode. In the HDMV mode, it is possible to write the playback control using commands that resemble the commands that can be interpreted by the DVD playback device, and thus it is possible to define a playback control in which the playback progresses with selections made on the menu.

FIG. 5B shows a scene of the movie work that is created by defining the dynamic playback control in the BD-J mode. In the BD-J mode, it is possible to write the control procedure in a Java™ language that can be interpreted by the Java™ virtual machine. Suppose here that the playback control constitutes a GUI for an adventure game, then, in the BD-J mode, it is possible to present, to the user, a resultant image which is composed of, for example, a video image, a score of the game ("SCORE:10000" in the drawing), an indicator ("LIFE:3"), buttons ("Ask" and "Leave"), and character animation.

FIG. 6 shows processing performed by an application provided via a BD-ROM to display the resultant video of FIG. 5B. The archive file xxx.JAR shown in FIG. 2 is depicted at the bottom of FIG. 6. At the top of FIG. 6, the BD-J application defined by the archive file is depicted (The BD-J application is a general application other than system applications and so on, and hereinafter called "service application"). The change in the processing load for rendering the character animation of FIG. 4 is schematically depicted within the frames of the service application in FIG. 6.

The left frame shows the case the processing load has been changed to increase. In the left frame, a cat character is displayed in full animation (i.e. 24 pictures per second).

The right frame shows the case the processing load has been changed to decrease. In the right frame, the cat character is displayed in half animation (i.e. 12 pictures per second). Such a change is made according to the value of the benchmark score stored in the application data area, which can be accessed via a fixed file path "ADA-Cert ID-Organization ID-Application ID". The prerequisite for the processing load change shown in the left frame is, for example, that the benchmark score is a predetermined threshold value or greater. The prerequisite for the processing load change shown in the right frame is, for example, that the benchmark score is less than the predetermined threshold value. In this way, the service applications, provided from a BD-ROM, are made to change the processing load according to the benchmark score stored in the application data area. Due to such a change, the response time from when the user instructs the BD-J application via the GUI to perform processing to when the processing completes does not depend on the rendering capability of the playback apparatus 102, and can be kept at a certain level.

This concludes the explanation of the BD-ROM 100. The following explains the details of the playback apparatus 102.

Figure 7:
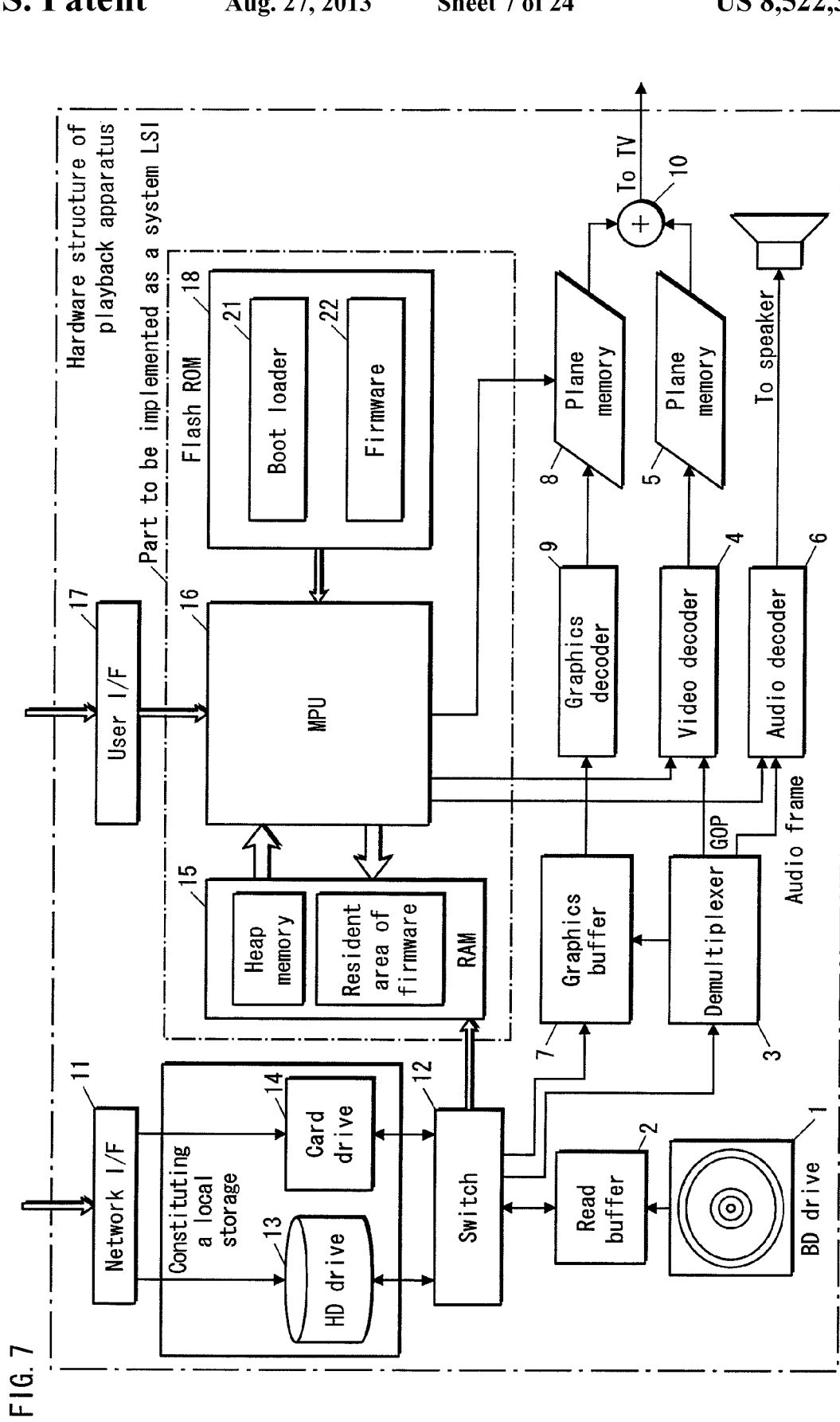
FIG. 7 shows a hardware structure of a playback apparatus pertaining to the present invention.

FIG. 7 shows the hardware structure of the playback apparatus 102. As FIG. 7 shows, the playback apparatus 102 includes a BD-ROM drive 1, a read buffer 2, a demultiplexer 3, a video decoder 4, a plane memory 5, an audio decoder 6, an elementary buffer 7, a plane memory 8, a graphics decoder 9, an adder 10, a network interface (I/F) unit 11, a switch 12, a hard disk (HD) drive 13, a card drive 14, a random-access memory (RAM) 15, an MPU 16, a user interface 17, and a flash ROM 18. The playback 102 has the hardware structure of FIG. 7 in which Java™ 2 Micro_Edition (J2ME) Personal Basis Profile (PBP 1.0) and Globally Executable MHP specification (GEM 1.0.2) for package media targets have been fully implemented.

The BD-ROM drive 1 performs loading/ejection of the BD-ROM that has the internal structure shown in FIG. 2, and accesses the BD-ROM. The BD-ROM drive 1 stores TS packets read from the BD-ROM into the read buffer 2.

The read buffer 2 is a FIFO memory, and stores therein TS packets read from the BD-ROM on a first-in first-out basis. The TS packets constitute an AV stream in MPEG2-TS format.

The demultiplexer 3 demultiplexes the AV stream in the MPEG2-TS format recorded on a BD-ROM, a removable medium and a Built-In medium, to obtain video frames and audio frames constituting a GOP. The demultiplexer 3 outputs the video frames to the video decoder 4, and the audio frames to the audio decoder 6. The demultiplexer 3 stores the graphics stream into the graphics memory 7. The demultiplexing performed by the demultiplexer 3 includes conversion from TS packets to PES packets.

The video decoder 4 decodes video frames output from the demultiplexer 3, and writes pictures in uncompressed format into the plane memory 5 for video.

The plane memory 5 is a memory for storing therein pictures in uncompressed format.

The audio decoder 6 decodes audio frames output from the demultiplexer 3, and outputs audio data in uncompressed format.

The graphics memory 7 is a buffer for storing therein graphics data and image files read from the BD-ROM, the removable medium, and the Built-in medium.

The plane memory 8 is a SD-RAM or the like having an area for storing one screen worth of data, and the memory allocation differs between the HDMV mode and the BD-J mode. According to the memory allocation in the HDMV mode, the plane memory 8 has an 8-bit area of 1920×1080. Such a memory allocation means that each pixel can store an 8-bit index value when the resolution is 1920×1080 pixels. The raster graphics stored in the plane memory 8 is displayed through conversion of the index color, with use of the CLUT (Color Lookup Table). On the other hand, according to the memory allocation in the BD-J mode, the plane memory 8 has a 32-bit area of 1920×1080. Such a memory allocation means that each pixel can store 32-bit RGB value when the resolution is 1920×1080 pixels. The BD-J application can directly display the graphics for the GUI by directly writing the 32-bit RGB values.

The graphics decoder 9 expands graphics data and image files stored in the graphics memory 7, and writes the resultant data into the plane memory 8. As a result of the decoding of the graphics stream, various menus and graphics appear on the screen.

The adder 10 outputs the result of synthesizing images expanded in the plane memory 8 for graphics with uncompressed-format picture data stored in the plane memory 5 for video.

The resultant image shown in FIG. 5B is output by the adder 10 synthesizing the graphics in the plane memory 8 and the picture data in the plane memory 5 for video.

The network I/F unit 11 executes a protocol stack for network connection. The network I/F unit 11 enables the playback apparatus 102 to recognize a drive of a computer on the network, as a network drive 4a. As the protocol stack, the network I/F unit 11 preferably uses the TCP/IP for transferring BD management data which requires reliability, and uses the UDP/IP for transferring AV stream which requires a high speed.

The switch 12 selectively writes files, read from the BD-ROM drive 1, the HD drive 13 and the card drive 14, into the RAM 15.

The HD drive 13 is a hard disk drive that can store therein class files provided via the BD-ROM and other similar class files.

The card drive 14 is a drive device that can load a SD memory card or the like that stores therein the class files provided via the BD-ROM and other similar class files.

The RAM 15 is structured from a static RAM or the like, and stores therein necessary data for MPU 16 performing data processing. The RAM 15 includes a firmware resident area where the firmware remains. The firmware resident area is accessible only in the privilege mode of the MPU 16, and programs running in the normal mode can not access the firmware resident area. This is for preventing the firmware from being destroyed unexpectedly.

The areas other than the firmware resident area are under management of a memory pool management function and a heap area management function.

The memory pool management function is to manage empty memory areas, provide a required memory area having a requested size to the BD-J application, and restore the memory area when the use of the provided memory area completes. The heap area management function is to set a memory pool to empty areas of the memory, and provide a required memory area having a requested size to the BD-J application. Such heap management allows the areas on the RAM 15 to be used as a "heap memory".

The MPU 16 is the core of the playback apparatus 102. The MPU 16 includes, as the minimum necessary components, a "fetch circuit" for fetching native codes from the instruction memory and the cache, a "decoder circuit" for decoding instruction codes, and an "arithmetic operation circuit" for performing arithmetic operations on values stored in the registers. Also, the MPU 16 has a privilege mode as an operation mode. Applications that can operate in this privilege mode can access the firmware stored in the RAM 15 and the flash ROM 18.

The user interface 17 detects and notifies user operations input from input devices, such as a remote control and a front panel of the playback apparatus 102. This notification is made as generation of a UOP in accordance with an interruption generated by an interruption handler provided in a device driver corresponding to the input device. The UOP is an event (UO event) that occurs when a key included in a key matrix provided on a remote control or a front panel is depressed and the depression of the key is detected. The UO has an attribution corresponding to the depressed key. More specifically, when the interruption handler provided in the device driver corresponding to the remote control or the front panel detects a depression of a key by a key sense for the key matrix, the interruption handler generates an interruption signal based on the key depression. The UO event is generated by the generation of the interruption signal.

The flash ROM 18 is an EEPROM, and stores therein built-in programs that have been built in the playback apparatus 102 in advance. Such built-in programs include, for example, a boot loader 21 and firmware 22. The flash memory is accessible only in the privilege mode of the MPU 16, and programs running in the normal mode can not access the flash ROM 18. This is for preventing the boot loader 21 and the firmware 22 from being destroyed unexpectedly.

This concludes the explanation of the hardware structure of the playback apparatus 102. The following explains the software structure that is based on the hardware structure explained above.

FIG. 8A shows files constituting the firmware 22. As FIG. 8A shows, the firmware 22 includes, for example, a plurality of "class files", a plurality of "executable files" and a plurality of "text files".

Among these files, the class files and the executable files are components of the firmware 22, and define controls performed by the playback apparatus 102. FIG. 8B is a layer model showing the controls performed by the playback apparatus 102.

As FIG. 8B shows, the controls performed by the playback apparatus 102 can be represented with a usual layer model in which the firmware 22 is placed on the hardware. The firmware 22 is hierarchized with, for example, a virtual file system 23, an access control mechanism 24, a playback engine 25, a playback control engine 26, a class loader 7 and a system application 28.

Also, the firmware 22 includes, as essential software components for accessing the persistent area, a file I/O program that realizes the Java™ I/O method, for example. This I/O program performs, for example, operations for returning a benchmark score written in the persistent area to a BD-J application that has made a request for accessing the benchmark score written in the persistent area. The following explains these components. Note that more precisely the software structure of the playback apparatus 102 includes an HDMV module for the HDMV mode and a module manager for switching between the BD-J mode and the HDMV mode. However, since these components are not the main features of the present invention, the explanations of these components are omitted here.

Virtual File System 23

The virtual file system 23 is a virtual file system for handling the download content stored in the local storage integrally with the disc content stored in the BD-ROM. Here, the download content stored in the local storage includes the clip information and the playlist information as FIG. 2 shows. The playlist information of the download content is different from the playlist information on the BD-ROM in that it can specify the clip information regardless of whether the clip information is on the BD-ROM or in the local storage. Regarding this specification, the playlist information on the virtual file system 23 does not necessarily use a full path to specify files on the BD-ROM or in the local storage. This is because the file system on the BD-ROM and the file system on the local storage are recognized as a single virtual file system (i.e. the virtual file system 23). Thus, the playlist information can specify the file system 23, AV streams on the BD-ROM by specifying a value, as the file body, of the files stored in the clip information. Via the virtual file system 23, the contents of the local storage are read and dynamically combined with the contents of the BD-ROM so that the playback can be realized in various manners. The disc contents as the combination of the local storage and the BD-ROM and the disc contents on the BD-ROM are handled in equality. Thus, it is assumed that the "BD-ROM" mentioned in this application includes a virtual recording medium consisted of a combination of the local storage and the BD-ROM.

Access Control Mechanism 24

The access control mechanism 24 performs forcible controls such that only BD-J applications that have been validly authorized (called "signed applications") can access the application data area in the local storage. As a result of such forcible controls, only BD-J applications having a valid digital credential can access the benchmark scored stored in the application data area.

Specifically, when a BD-J application makes a read request for accessing the application data area in the local storage with use of a fixed file path, the access control mechanism 24 checks the access right of the digital credential of the BD-J application. If judged that the application has an access right, the access control mechanism 24 reads desired data from the application data via the API (Java I/O method) for file I/O in the file system 23, and passes the read data to the service application.

Playback Engine 25

The playback engine 25 performs AV playback functions. The AV playback functions of the playback apparatus 102 are conventional functions inherited from DVD players and CD players, including playback start (Play), playback stop (Stop), pause (Pause On), cancellation of the pause (Pause Off), cancellation of "Still" function (still off), fast-forward with speed specification (Forward play (speed)), rewind with speed specification (Backward play (speed)), switching of audios (Audio Change), switching of sub-videos (Subtitle Change), switching of angles (Angle Change), and so on. To realize the AV playback functions, the playback engine 25 controls the decoder to decode the part that corresponds to the desired time point included in the AV stream read into the buffer. The playback engine 25 can play back the AV stream from the given time point by causing the decoder to perform the decoding from the desired time point.

Playback Control Engine 26

The playback control engine 26 performs functions such as (i) playback control on the playlist information and (ii) acquisition/setting of the state of the playback apparatus 102. The playback control on the playlist information is to cause the playback engine 25 to perform, among AV playback functions thereof, playback start and playback stop, according to the current playlist information and the clip information. The playback control engine 26 performs these functions (i) and (ii) according to an API call from the upper layer. The pair of the playback engine 25 and the playback control engine 26 is called "AV playback library", and is implemented in the playback apparatus 102 as a library used particularly for the AV playback.

BD-J Module 27

The BD-J module 27 is a Java™ platform, and includes a Java™ virtual machine, a configuration, and a profile. The Java™ virtual machine is an interpreter that interprets and executes byte codes included in the instances of the class files. The Java™ virtual machine translates the byte codes to native codes, and causes the MPU 16 to execute them. This interpreter is an important part that directly affects the execution speed of the BD-J application. Specifically, the BD-J module 27 can be implemented as an interpreter that is equipped with a JIT compiler that converts byte codes to native codes. With such a JIT compiler, it is possible to speed up the interpretation. Also, part of the interpreter may be implemented as hardware.

System Application 28

System application 28 is a system program defined with class files, and is located in the heap memory of the RAM 15. System applications include, for example, "class loader" for converting object-oriented language structure stored in the class file to byte codes and loading the byte codes onto the heap memory, "application manager", "user event manager" for processing events to be output to the application, "benchmark score setting unit", and so on.

This concludes the explanation of the system application 28. The following explains the details of the benchmark score.

<Benchmark Score>

The text files shown in FIG. 8A contains, for example, benchmark scores of the hardware and the firmware 22, which are incorporated in the playback apparatus 102. The benchmark score is a barometer of performances of the hardware and the firmware incorporated in the playback apparatus. The benchmark test is a test for calculating or measuring the barometer. The benchmark program is a program used for the benchmark test. The benchmark test for the playback apparatus 102 pertaining to the present invention is performed before shipment of the playback apparatus 102. The manufacturer executes the benchmark application 29 on the playback apparatus 102 before the shipment. The text files incorporated in the firmware 22 is the results of the benchmark text by an authorized application, for example. The results are written in the text files as the benchmark scores. At this moment, the digital certificate for the benchmark score, the organization ID of the organization that has issued the benchmark program used for the calculation of the benchmark program, and the application ID of the benchmark program.

The incorporated benchmark score is, for example, a turn-around time from when a processing request is made to the hardware via the firmware 22 and when the hardware completes the processing and returns a response. When the firmware 22 is executed for the first time, the benchmark score is stored into the application data area, with use of the fixed path. This fixed path is, for example, the combination shown in FIG. 14, that is ADA-Cert ID-Organization ID-Application ID. The Cert ID, the Organization ID and the Application ID can be respectively identified based on the digital credential for the benchmark score, the organization ID of the organization that has issued the benchmark program used for calculating the benchmark score, and the application ID of the benchmark program. The benchmark score is identified by the fixed file path, after checking of whether it is tampered with, and checking of the validity of the digital credential, for example. The fixed file path is identified based on the combination of the Cert ID of the root certificate (e.g. held in the playback apparatus) corresponding to the provider root certificated identified based on the digital credential mentioned above, the organization ID mentioned above, and application ID of the benchmark program. Thus, even if the firmware 22 is updated, the fixed file path does not change. Also, the benchmark score does not change as long as the firmware 22 is not updated. If the firmware 22 is updated, a new benchmark score as new test results will be written into the application data area.

Before the shipment of the playback apparatus 102, the manufacturer conducts a benchmark test on the playback apparatus 102 with the firmware 22 incorporated therein. The benchmark score as the result of the benchmark test will be incorporated into the firmware 22. The benchmark score incorporated in the firmware 22 will be written into the application data area. Further, for example, if the firmware 22 of the playback apparatus 102 installed in the user's house is updated, the benchmark score incorporated in the firmware 22 will be recorded at an intended location in the application data areas at the first execution of the updated firmware 22. The location is, specifically, the application data area identified by the fixed file path ADA-Cert ID-Organization ID-Application ID, which is shown in FIG. 6.

For example, the following are included in the hardware processing procedures of the benchmark test performed via the firmware 22:

(a) expansion of compressed image data such as JPEG and PNG, loading of such compressed image data to the memory, loading of audio data to the memory and loading of font data, (b) AV playback, switching of AV streams, switching of subtitles, audios and so on, (c) calculations such as floating-point operations and trigonometric function operations, rectangular image rendering (including or not including a blending), image magnification and minification, polygon rendering, sprite rendering, character strings rendering and so on.

These processing procedures are officially authorized as processing procedures that can be used for the benchmark test, and can be identified by unique IDs. In the case such processing procedures correspond to available API methods, the function names of the API methods may be used as the IDs.

The results of the benchmark test using the processing procedures mentioned above, namely:

1) the turn-around time between a request for expanding compressed image data such as JPEG data and PNG data and completion of the processing;

2) the turn-around time between a request for loading to the memory and completion of the processing;

3) the turn-around time between a request for the AV playback and actual start of the playback;

4) the turn-around time between a request for switching of AV streams and completion of the processing;

5) the turn-around time between switching of subtitles, audios, etc. and completion of the processing;

6) the turn-around time between a request for floating-point operations, trigonometric function operations, etc. and the completion of the processing;

7) the turn-around time between a request for rectangular image rendering and completion of the processing; and 8) the turn-around time between a request for image magnification and minification, polygon rendering, sprite rendering, character strings rendering, etc. and completion of the rendering are to be incorporated into the firmware 22, as the benchmark scores. These incorporated results of the benchmark test can be used as barometers showing the amount of the load on the playback apparatus 102 when the playback apparatus 102 presents in the BD-J mode the combination of the character animation and the movie to the user as FIG. 5 shows, for example. According to the barometers, the playback apparatus 102 can dynamically change the processing load due to the character animation, as FIG. 6 shows.

Next, the structure of the benchmark scores is explained.

The benchmark scores are structured from, for example, IDs of processing procedures used for the benchmark test and the measured turn-around times in one-to-one association. The texts files incorporated in the firmware are in list form including pairs of an ID of a processing procedure used for the benchmark test and a measured turn-around time. Using the IDs, it is possible to acquire the turn-around time of any of the processing procedures.

If such IDs are officially defined, the service applications can make a request for reading of the text files containing the benchmark scores by using the IDs as arguments. With such a structure, it is also possible to pass any of the benchmark scores contained in the text files corresponding to the arguments to the service applications.

It is preferable that the turn-around times are represented with time accuracy at 45 kHz level. This is because each of PES packets included in the AV stream is given a PTS (Presentation Time Stamp) and a DTS (Decode Time Stamp), and the playback apparatus 102 includes an STC (System Time Clock) that operates with time accuracy of $1/45,000$ sec. The benchmark scores created with the time accuracy for the STC realize precise synchronization with the playback of the AV stream. Note that since the In_Time and Out_Time of the playlist information is defined with the time accuracy of 45 kHz, the turn-around times represented with time accuracy corresponding to 45 kHz are preferable for changing the processing load on the playback.

Such benchmark scores are incorporated into the firmware 22 by the manufacturer when the firmware 22 is completed in the development environment for the playback apparatus 102. The following explains how the manufacturer has obtained the benchmark scores.

Figure 9:
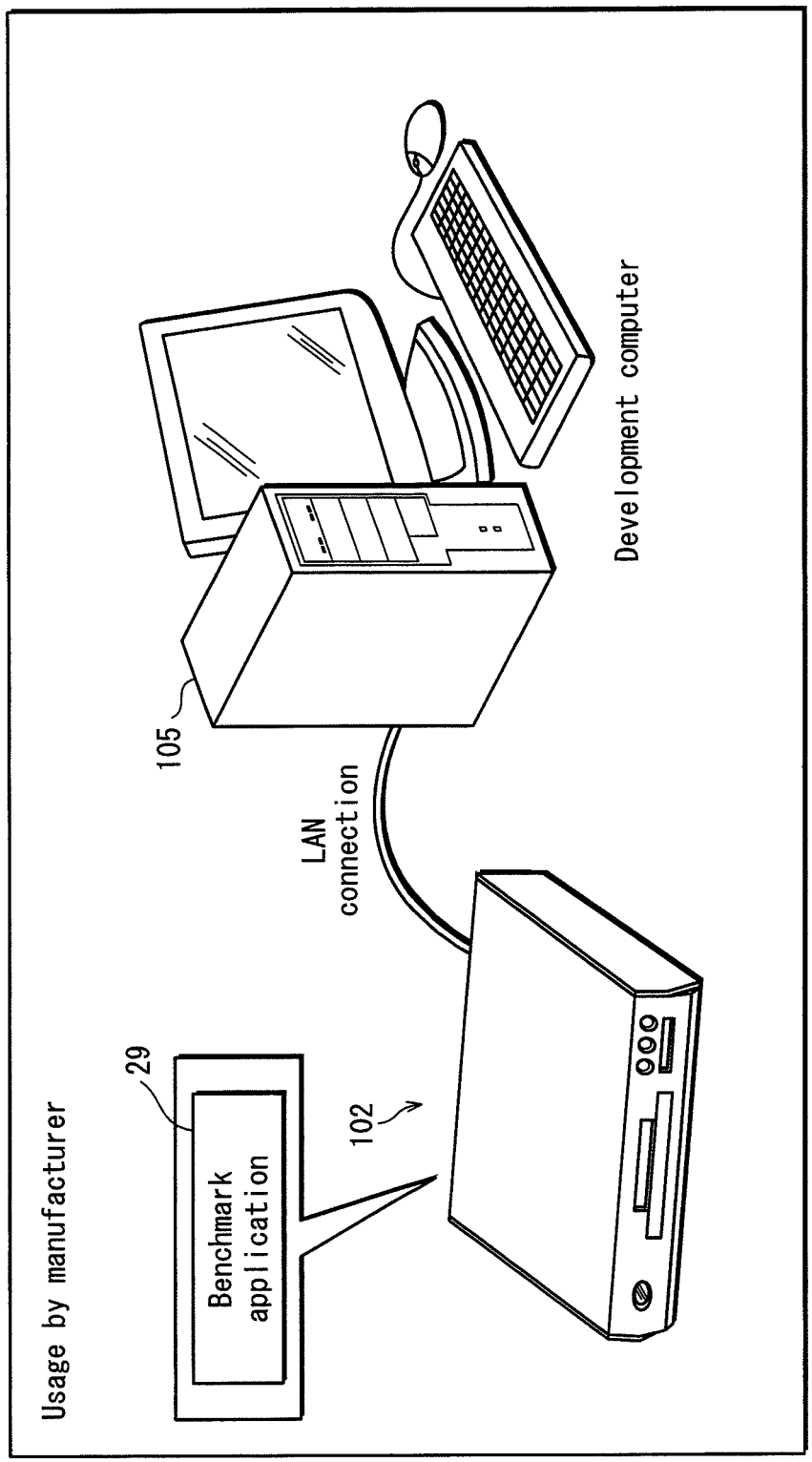
FIG. 9 shows a development environment for the playback apparatus.

FIG. 9 shows the development environment for the playback apparatus 102. In this development environment, the playback apparatus 102 is connected with a computer 105 for the development, via a LAN. The firmware 22 does not store the benchmark scores, but stores therein the executable files and the class files. Because of these files, the playback apparatus 102 has the same functions as playback apparatus products to be provided to users. The playback apparatus 102 will be provided with the benchmark application 29.

The development computer 105 is equipped with software including IDE and ADK, and provides development environment via the LAN for the firmware to the users. The IDE (Integrated Development Environment) is structured from, for example, a compiler for building a system application.

The ADK (Application Development Kit) is a development environment for realizing debugging of the system application with use of the mechanism of the JPDA (Java Platform Debugger Architecture).

The data transfer between the playback apparatus 102 and the computer 105 is performed via the serial port and Socket between them. The Socket is a communication path in the session layer located on the IEEE 802.3 (Ethernet), IP, TCP/UDP. Since the IEEE 802.3 (Ethernet), IP, TCP/UDP is adopted in the system application, the Socket can be used as the transmission path for the debugging, as a matter of course.

Figure 10:
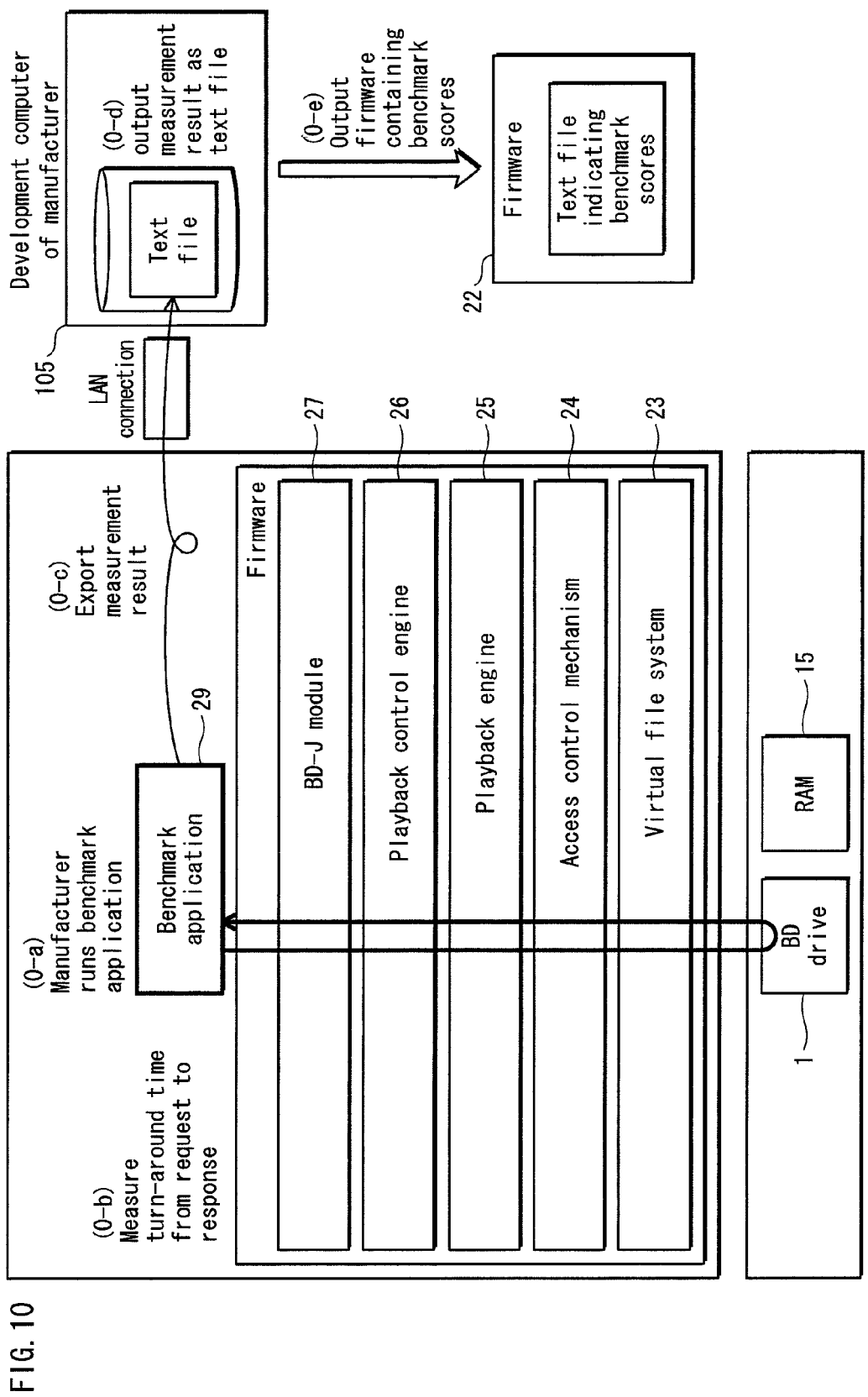
FIG. 10 explains how benchmark scores to be contained in text files have been obtained.

FIG. 10 explains how benchmark scores to be contained in text files have been obtained. This drawing schematically shows an example process for creating the firmware 22, performed before the shipment.

This drawing is based on FIG. 8B, and the differences from the layer model shown in FIG. 8B is that the benchmark application 29 runs on the BD-J module 27 and the computer 105 is connected with the playback apparatus 102. The benchmark application 29 is read from, for example, one of the BD-ROM drive 1, the HD drive 14 and the card drive 14, and runs on the BD-J module 27. The computer 105 is operated by an operator belonging to the manufacturer.

The U-shaped arrow in this drawing schematically shows the process performed from when the benchmark application 29 makes a request for processing to the hardware via the firmware to when the processing completes and a response is returned to the benchmark application 29. The benchmark application 29 measures the turn-around time at the time that is before the shipment of the playback apparatus for each of the various functions that the hardware can perform, and exports the measured turn-around times to the computer 105 connected externally. The computer 105 accumulates the measured values on a database on the hard disk, and generates text files containing a plurality of measured values step by step. When the benchmark test completes for all the series of functions and the accumulation of the measured values completes, the computer 105 integrates the obtained text files with the executable files and the class files to obtain the firmware 22.

As explained above, the firmware 22 of the playback apparatus 102 completes through the measurement of the turn-around times and the incorporation of the benchmark scores as the results of the measurement.

The text files, which contain the benchmark scores, are integrally managed with the executable files and the class files that constitute the firmware 22. These files, namely the text files, the executable files and the class files may be stored in a single ZIP file, for example.

At the booting, the text files, which contain the benchmark scores, are read from the firmware 22 to the RAM 15 together with the executable files and the class files, and allocated in the resident areas in the RAM 15 and mapped in the memory space of the MPU 16. The text files, which contain the benchmark scores, are integrated with the executable files and the class files, and such a state of the benchmark scores is described as "incorporated in the firmware 22" in this Description.

This concludes the execution of the benchmark test by the manufacturer.

Updating of the Firmware 22

The following explains how the user updates the firmware 22.

As a removable medium for storing the new firmware 22, an SD memory card and a CD-R are available, for example.

A WWW site on a WWW server managed by the manufacturer, which is an official WWW site of the manufacturer, notifies bugs and the latest update state of the firmware 22 of the playback apparatus 102. In the case the playback apparatus 102 is connected with a network, the playback apparatus 102 always monitors the update state. When the update of the firmware 22 is notified, the playback apparatus 102 downloads a ZIP file containing the new firmware 22 via the network, and writes it into the removable medium. As described above, the executable files, the class files and so on constituting the firmware 22 are contained in the Zip file, together with the text files. Thus, the playback apparatus 102 can complete the preparation of the updating by writing the ZIP file containing the new firmware 22 into the removable medium.

In the case the playback apparatus 102 is not connected with the network and is used standalone, the personal computer that belongs to the user monitors, for the playback apparatus 102, the update state of the firmware 22 of the playback apparatus 102. Such monitoring can be automatically performed by the personal computer if a software kit provided together with the playback apparatus 102 has been installed in the personal computer. When the update of the firmware 22 is notified, the personal computer downloads the ZIP file containing the new firmware 22 via the network, and writes it into the hard disk thereof.

The preparation for the updating of the firmware 22 completes when the ZIP file containing the new firmware 22 is written into the removable medium. The ZIP file 22 containing the new firmware 22 is given a particular characters/numbers (magic numbers) as the file name, so that it can be distinguished from other files. The playback apparatus 102 updates the firmware 22 when a removable medium storing the file having the magic numbers is mounted. This concludes the explanation of the updating of the firmware 22 by the user.

Boot Loader 21

The following explains the boot loader 21, which is one of the software components of the playback apparatus 102.

FIGS. 11A, 11B and 11C show the internal structures of the boot loader 21 and the system application 28.

FIG. 11A shows the internal structure of the boot loader 21. As the drawing shows, the boot loader 21 includes a firmware startup unit 31 and a firmware update unit 32. Also, as FIG. 11B shows, there is "a flag indicating an initial execution". When the flag indicates "0", it shows that the firmware 22 has not been executed. When the flag indicates "1", it shows that although the initial execution of the firmware 22 has been completed, the writing of the benchmark scores into the application data area has not been completed.

When the flag indicates "2", it shows that the initial execution of the firmware 22 and the writing of the benchmark scores into the application data area have been completed.

Firmware Startup Unit 31

The firmware startup unit 31 is one of programs that can operate in the privilege mode of the MPU 16. When the power switch of the apparatus is pressed, and accordingly the power unit supplies the power to the MPU 16 and the devices and these pieces of hardware are started up, the firmware startup unit 31 loads the firmware 22 stored in the flash ROM 18 into a memory (e.g. the firmware resident area in the RAM 15, shown in FIG. 7) so that the MPU 16 can executes the firmware 22. At this loading, the firmware startup unit 31 judges whether the value of the flag is "0" or not, in order to judge whether the execution of the firmware 22 is the initial execution or not. If the execution is the initial execution, the firmware startup unit 31 sets "1" to the flag. The initial execution of the firmware 22 is the initial execution of the firmware 22 by the manufacturer after the completion of the firmware by the manufacturer, and the initial execution of the firmware after the updating of the firmware 22 by the user.

Figure 12:
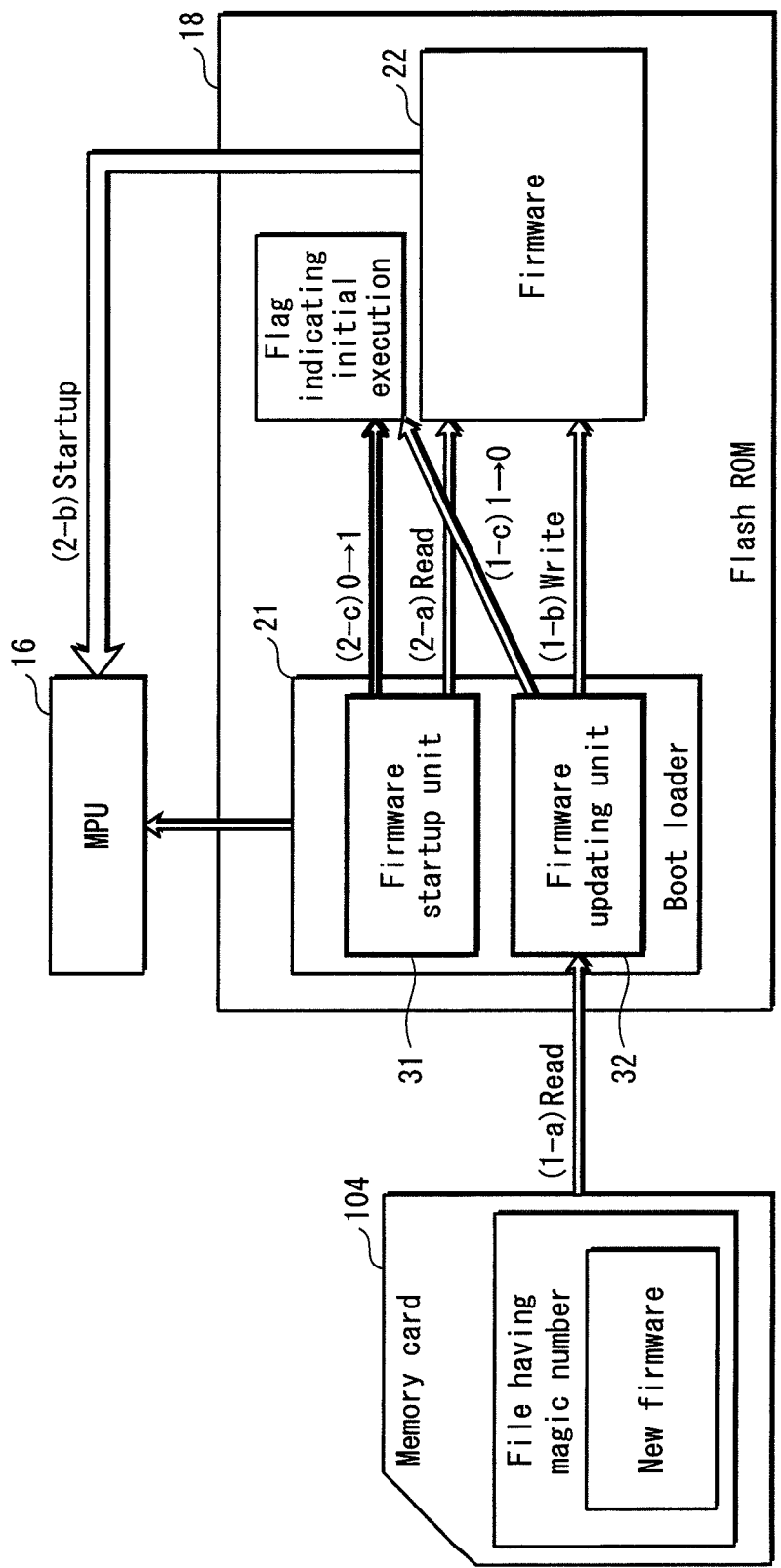
FIG. 12 schematically shows processing procedures that a firmware startup unit 31 executes and paths via which a firmware 22 is provided to an MPU 16.

FIG. 12 s shows what processing procedures the firmware startup unit 31 executes and via what path the firmware 22 is provided to the MPU 16. The arrow (2-a) shows a read instruction from the firmware startup unit 31, and the arrow (2-b) shows the provision of the firmware 22 from the flash ROM 18 to the MPU 16. The arrow (2-c) schematically shows the updating of the flag (from 0 to 1) by the firmware startup unit 31.

Firmware Update Unit 32

The firmware update unit 32 is one of programs that can operate in the privilege mode of the MPU 16. When the power switch of the apparatus is pressed, and accordingly the power unit supplies the power to the MPU 16 and the devices and these pieces of hardware are started up, the firmware update unit 32 judges whether a removable medium containing the new firmware 22 is mounted or not. If such a removable medium is mounted, the firmware update unit 32 checks whether the removable medium contains a files whose file name is a magic number. A magic number is a particular number showing that the removable medium contains the updated firmware 22. If the removable medium contains a file having such a magic number, the firmware update unit 32 reads the new firmware 22 from the removable medium, and overwrites the firmware 22 with the new firmware 22. After the overwriting, the firmware update unit 32 updates the flag to "0".

FIG. 12 schematically shows the traffic of instructions by the firmware update unit 32 and data, with use of arrows. The arrow (1-a) shows reading of the new firmware 22 having a magic number, and the arrow (1-b) schematically shows the overwriting with use of the new firmware 22. The arrow (1-c) schematically shows the updating of the flag (from 0 to 1) by the firmware update unit 32.

This concludes the explanation of the boot loader 21. The following explains the details of the system application 28, again with reference to FIG. 11C. The system application 28 shown in FIG. 11C includes descriptions of an application manger 33 and a benchmark score setting unit 34. Among the components of the system application 28, the explanations of the class loader and the user event manager are omitted here, because they have been explained above.

Application Manager 33

The application manager 33 performs the application signaling, based on the application management table (AMT) of the BD-J object. Specifically, when switching between playback-target titles occurs during the playback by the playback apparatus 102, the application manager 33 refers to the application management table of the BD-J object that corresponds to the new title, and judges which BD-J application whose life cycle is defined by the new title. Then, the application manager 33 instructs the class loader to load the judged BD-J application. As processing procedures particular to the present embodiment, the application manager 33 runs the benchmark score setting unit 34 so as to be executed by the BD-J module 27 when a BD-ROM is loaded to the playback apparatus 102 and the playback apparatus 102 is started up.

Benchmark Score Setting Unit 34

The benchmark score setting unit 34, which corresponds to the initialization unit, is one of programs that can operate in the privilege mode of the MPU 16. The benchmark score setting unit 34 judges whether the flag, which indicates whether the execution of the firmware is the initial execution or not, is "0" or not. If the flag shows "0", the benchmark score setting unit 34 reads the benchmark scores from the firmware 22 in the flash ROM 18, and writes the scores into the application data area.

Figure 13:
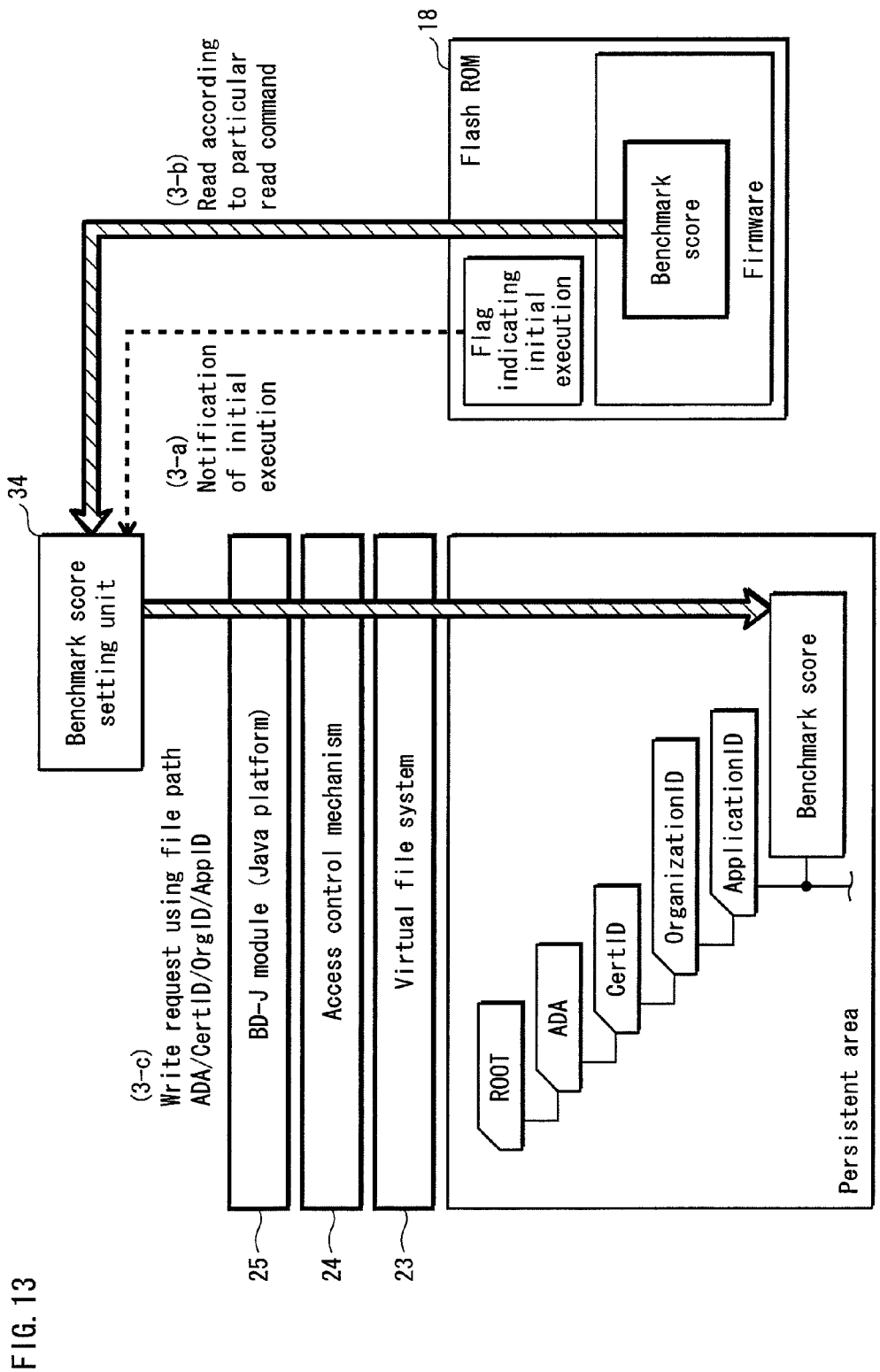
FIG. 13 shows paths via which benchmark scores stored in a flash read-only memory (ROM) 18 is provided to a benchmark score setting unit 34.

FIG. 13 shows the paths via which benchmark scores stored in the flash ROM 18 is provided to the benchmark score setting unit 34. The arrow (3-a) shows the paths via which the flag is provided. The value of the flag is provided to the benchmark score setting unit 34, and used for judging whether the execution of the firmware 22 is the initial execution or not, and whether the benchmark scores have been written into the application data area.

The arrow (3-b) schematically shows the paths via which the benchmark scores are provided from the flash ROM 18 to the benchmark score setting unit 34. The benchmark scores are read from the flash ROM 18 according to issuance of a particular read command (read request) that can be executed only in the privilege mode of the MPU, and are passed to the benchmark score setting unit 34.

The arrow (3-c) schematically shows the paths via which the benchmark scores are provided from the benchmark score setting unit 34 to the persistent area (i.e. application data area). The benchmark scores are written into the application data area according to a write request that uses a fixed file path "ADA-Cert ID-Organization ID-Application ID". The service application issues the write request by calling the API method for file reading. The access destination pertaining to the write request can be specified by a fixed file path.

As explained above, the benchmark scores that are incorporated in the firmware 22 are provided to the playback apparatus 102, and to be stored into the application data area when the firmware 22 is executed for the first time.

Figure 14:
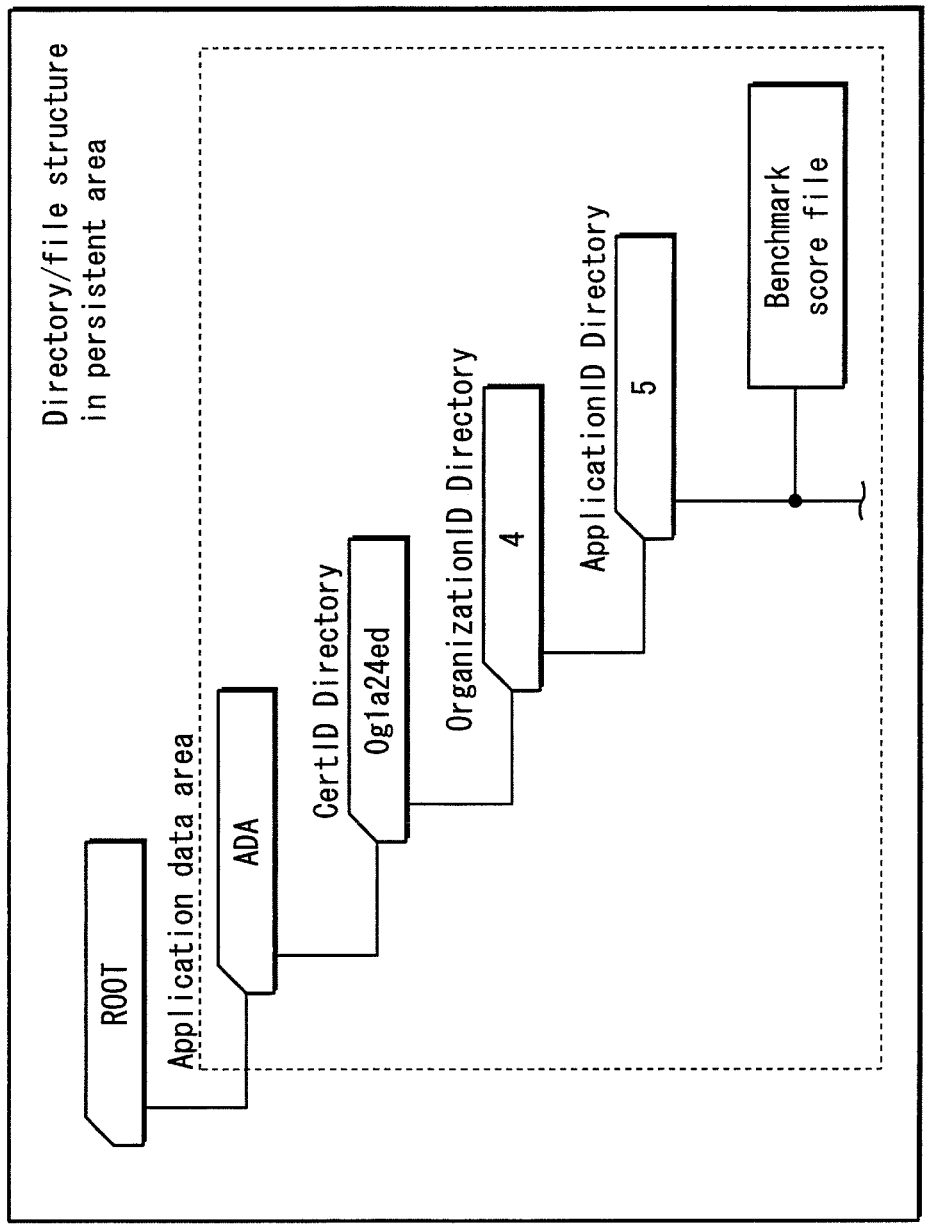
FIG. 14 shows an example directory/file structure in the case a Cert ID is "0g1a24ed", an Organization ID is "4" and an Application ID is "5"

In the case the Cert ID is "0g1a24ed", the Organization ID is "4" and the Application ID is "5", the benchmark scores having the directory/file structure shown in FIG. 14 will be stored. FIG. 14 shows an example directory/file structure in the case the Cert ID is "0g1a24ed", the Organization ID is "4" and the Application ID is "5".

In the case "4" of the Organization ID shows an example standards promotion group of the BD playback apparatuses 102, and "5" of the Application ID is an example of the benchmark application 29, the benchmark scores will be read via the file path represented as the combination of the ID of the organization and the ID of the benchmark application 29.

The following explains accesses to the application data area.

Figure 15:
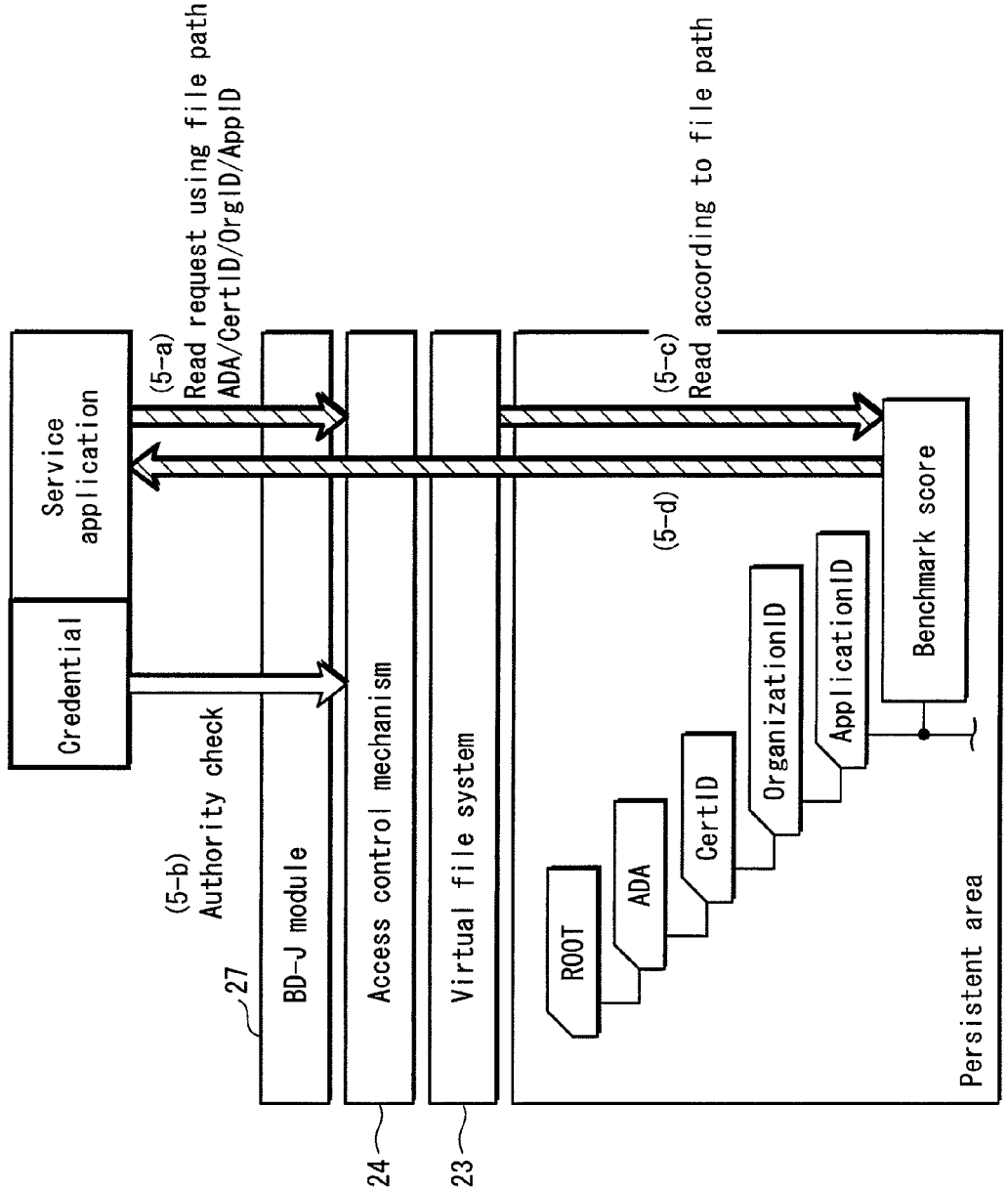
FIG. 15 shows paths via which benchmark scores stored in an application data area are provided to a service application.

FIG. 15 shows the paths via which the benchmark scores stored in the application data area are provided to a service application.

The arrow (5-a) shows the provision path of the read request issued by the service application. The service application issues the read request by calling the API method for file reading. The access destination pertaining to the read request can be specified by a fixed file path. The drawing shows that the read request using the fixed file path is passed to the access control mechanism 24 and used by the access control mechanism 24 to perform the authorization check.

The arrow (5-b) schematically shows the paths via which the service application provides the digital credential to the access control mechanism 24. The digital credential will be passed to the access control mechanism 24.

The arrow (5-c) schematically shows the provision paths of the benchmark scores from the application data area to the service application. If the service application has found to have a valid right, the system application 28 accesses the persistent area in the local storage according to the read request. As a result, the benchmark scores will be passed to the service application as the arrow (5-d) shows.

This concludes the explanation of the components of the system application 28. The following explains the processing procedures performed by the firmware update unit 32 and the firmware startup unit 31.

Figure 16B:
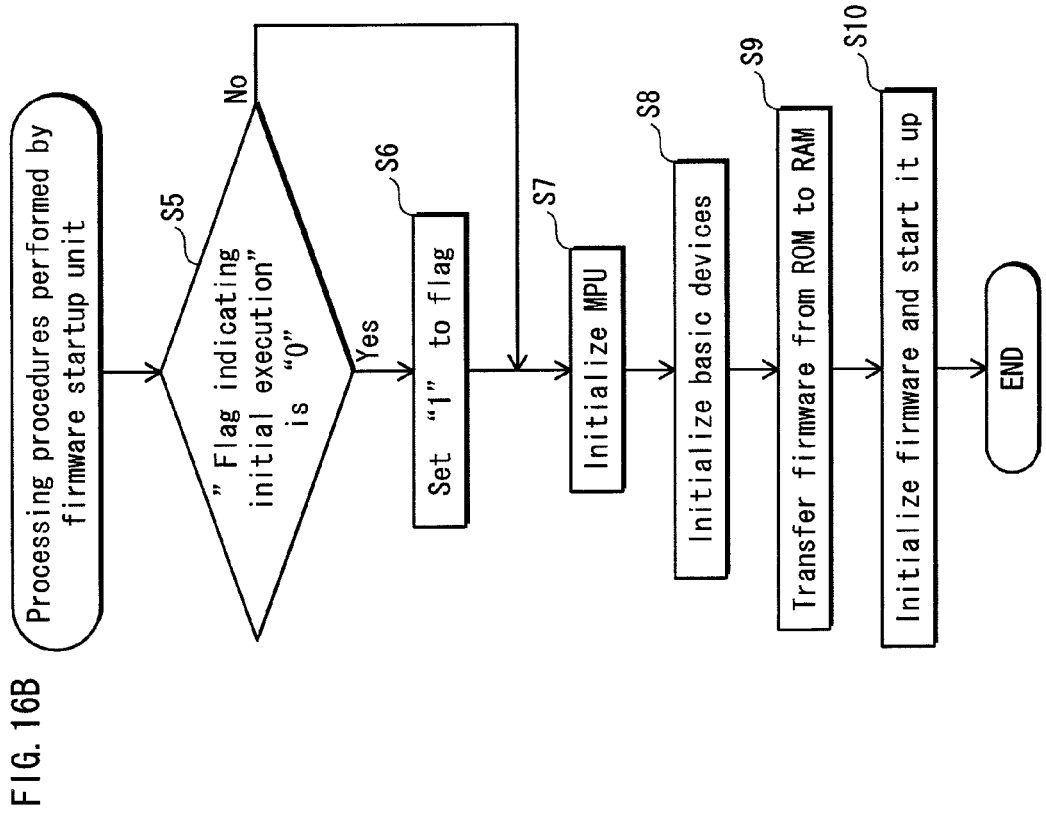
FIG. 16B is a flowchart showing processing procedures performed by the firmware startup unit 31.
Figure 16A:
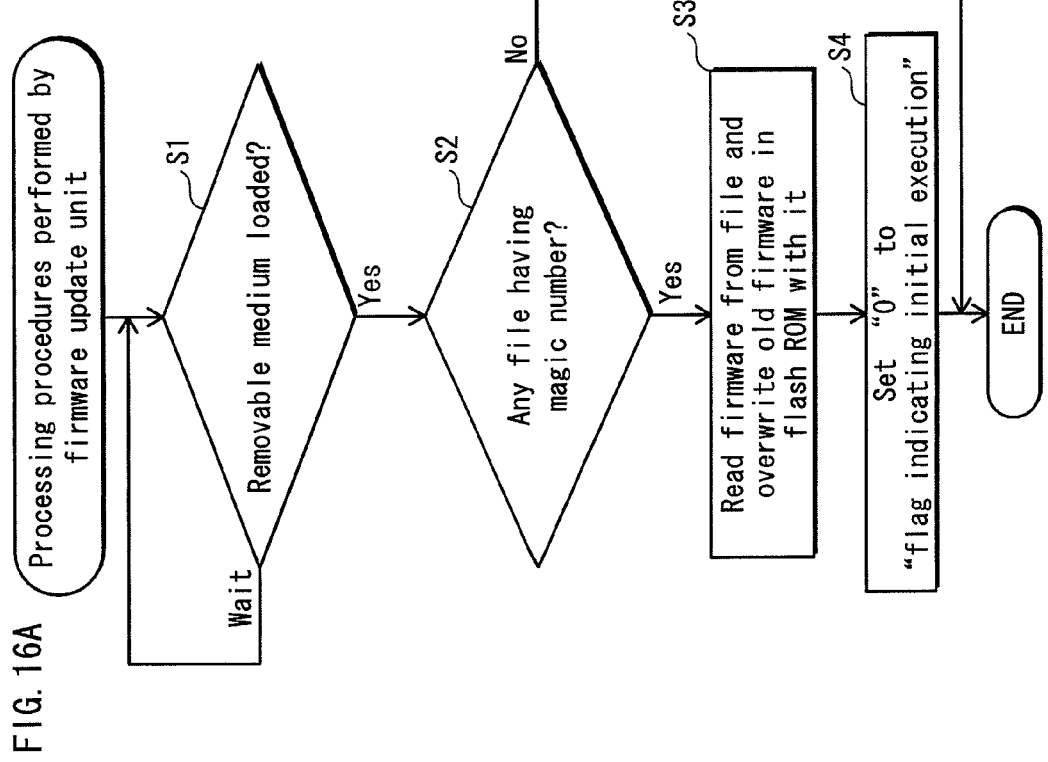
FIG. 16A is a flowchart showing processing procedures performed by a firmware update unit 32.

FIG. 16A is a flowchart showing processing procedures performed by the firmware update unit 32. Step S1 is for monitoring whether a removable medium is loaded or not. The processing moves to S2 when a removable medium is loaded. Step S2 is for judging whether a file having a magic number exists or not. If there is no such a file, the firmware update unit 32 does not perform any processing and finishes the processing procedures of this flowchart. If such a file exists, the firmware update unit 32 reads the firmware 22 from the removable medium in Step S3, and overwrites the old firmware 22 stored in the flash ROM 18 with the read firmware. After that, in Step S4, the firmware update unit 32 sets "0" to the flag in the flash ROM 18.

FIG. 16B is a flowchart showing processing procedures performed by the firmware startup unit 31. When the power is turned on, a reset interruption to the MPU 16 occurs and a reset vector is set to the program counter of the MPU 16, and an initialization program is executed. As a result the operation mode of the MPU 16 is determined and the various registers in the MPU 16 are initialized. Next, the clock, the bus, the memory and so on are initialized. After the initialization of the MPU 16, the initialization of the program will be started. Then, the processing will be carried over by the firmware startup unit 31. Step S5 is for judging whether the flag is "0" or not. According to the result of this judgment, the firmware startup unit 31 executes or skips Step S6. If the flag is "0", the firmware startup unit 31 sets "1" to the flag in Step S6. As a result, the flag shows that first execution of the firmware 22 in the flash ROM 18 has been conducted.

After that, the firmware startup unit 31 initializes the MPU 16 (Step S7), initializes the basic devices (Step S8) and transfers the firmware 22 from the flash ROM 18 to the RAM 15 (Step S9). Finally, the firmware startup unit 31 initializes the firmware 22 and starts up the firmware 22 (Step S10).

Figure 17:
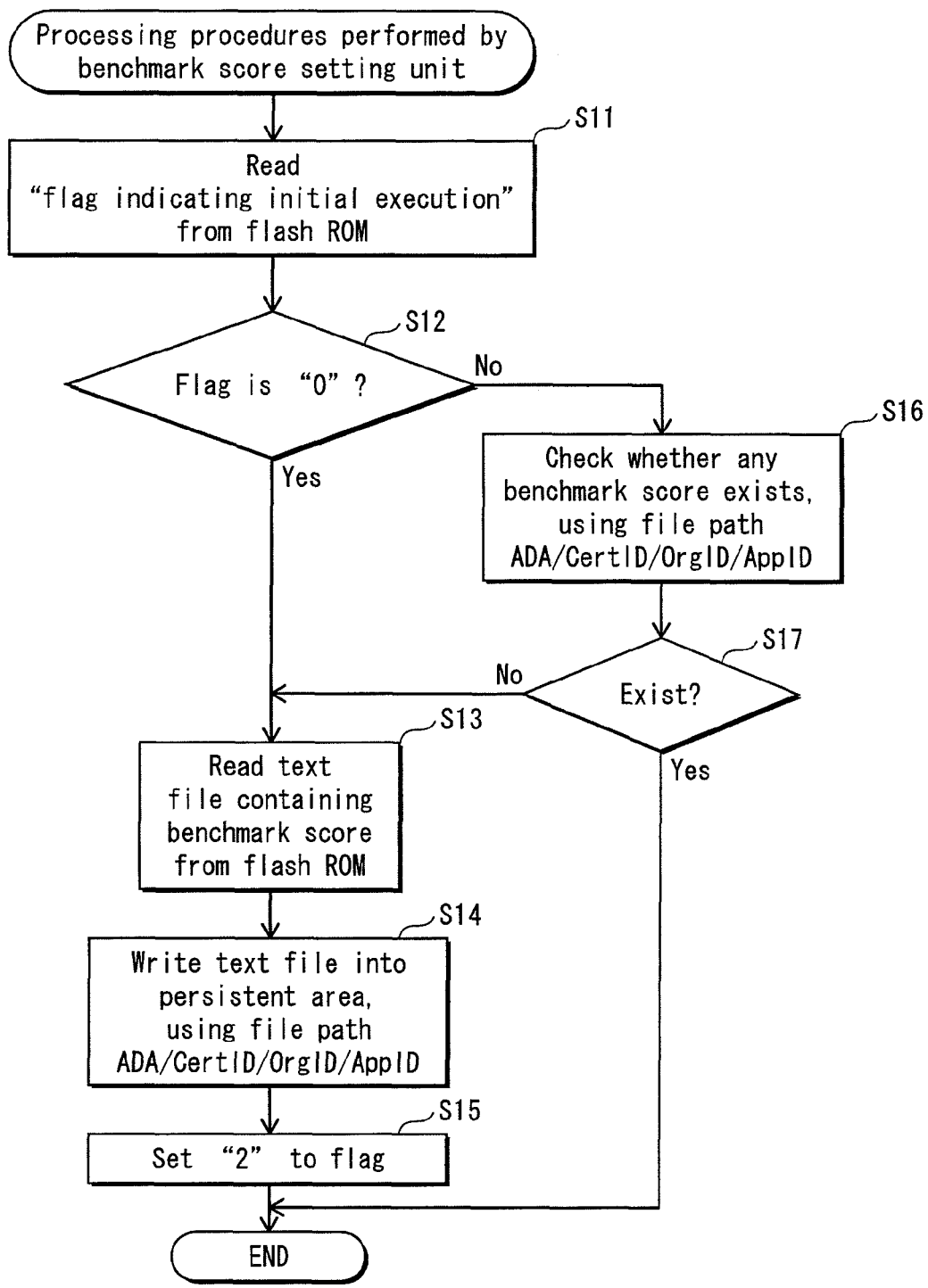
FIG. 17 is a flowchart showing processing procedures performed by the benchmark score setting unit 34.

FIG. 17 is a flowchart showing the processing procedures performed by the benchmark score setting unit 34. As the flowchart shows, the benchmark score setting unit 34 firstly reads the flag from the firmware 22 (Step S11), and performs Step S12, which is a judgment step. Step S12 is for judging whether the flag is "1" or not. If the flag is "1", the benchmark score setting unit 34 executes Steps S13 to S15. If the flag is not "1", the benchmark score setting unit 34 executes Step S16 and S17.

The processing procedures of Steps S13 to S15 is for reading text files containing the benchmark scores from the firmware 22 (Step S13), writing the read text files into the application data area by using the fixed file path represented as the combination "ADA-Cert ID-Organization ID-Application ID" (Step S14), and setting "2" to the flag (Step S15).

The processing procedures of Steps S16 and S17 are for checking whether the benchmark scores exist or not by using the file path (Step S17), and if the benchmark scores exist, finishing the processing, but if the benchmark scores do not exist, reading benchmark scores from the firmware 22 and writing them into the application data area (Step S13 to Step S15).

According to this example as explained above, the benchmark scores are incorporated in the firmware 22, and when the firmware 22 is executed for the first time, the benchmark scores are written into the application data area. Thus, the BD-J application can change the processing load according to the performance of the hardware simply by accessing the application data area.

Since the benchmark scores are incorporated in the firmware 22, even if the firmware 22 is irregularly updated, the benchmark scores corresponding to the latest firmware 22 will be provided to the playback apparatus 102.

Second Embodiment

The present embodiment specifically discloses how the access control mechanism 24 checks the access right. Such an access right check is performed on the digital credential.

The digital credential is provided by a distributor of a benchmark program (or benchmark scores) or a digital credential to a content author (application creator) that requests the digital credential. For providing the digital credential, the following distribution operations are required.

A) The distributor uses a public key to create the digital credential.

B) The content author requests the distributor that the public key is provided together with the digital credential. At this moment, the content author provides the distributor with a certificated hash value.

C) The distributor uses the provided hash value to create the digital credential.

Through these operations, the distributor can obtain a valid digital credential. The BD-J application having the valid digital credential can access the benchmark scores stored in the application data area. However, no BD-J application not having the valid the valid digital credential can access the benchmark scores stored in the application data area.

Such a digital credential is incorporated in an archive file and recorded on the BD-ROM, and provided to the playback apparatus 102. For the verification of the functional segments, the BD.ROOT.CERTIFICATE (disc root certificate) shown in FIG. 2 and other files included in the archive file are required in addition to the digital credential explained above. The following explains the internal structure of the archive file.

The Java™ archive file (xxx.JAR) stores a plurality of files in a directory structure. FIG. 18A illustrates an example internal structure of the contents of a Java™ archive file. In this structure, the root directory has XXXX.class files and a META-INF directory immediately below the root directory. The META-INF directory contains files called MANIFEST.MF, SIG-BD.SF, SIG-BD.RSA and bd.XXXX.perm. Hereinafter, these files will be described one by one.

(i) XXXX.class: Class File

The class files contain a class structure described in an object-oriented language, such as the Java language.

(ii) MANIFEST.MF: Manifest File

The manifest file is provided in correspondence with a digital certificate. The manifest file contains the attributes of the Java™ archive file and the hash values of the class files and data files contained in the Java™ archive file. The attributes of the Java™ archive file include an application ID assigned to a BD-J application, which is an instance of the class files, and the name of a class file to be executed first for execution of the Java™ archive file. In the case where the manifest file does not contain the two attributes of the Java™ archive file described above, the BD-J application, which is an instance of the class files contained in the Java™ archive file, is not executed.

(iii) SIG-BD.SF: Signature File

The SIG-BD.SF contains the hash value of the manifest file.

(iv) SIG-BD.RSA: Digital Signature File

The SIG-BD.RSA contains one or more "digital certificate chain" and "signature data" of the SIG-BD.SF.

The "signature data" contained in the SIG-BD.SF is generated by applying a signature process to the SIG-BD.SF. The signature process is carried out using a secret key that corresponds to a public key in the digital certificate chain contained in the SIG-BD.RSA.

The "digital certificate chain" refers to a sequence of digital certificates. The first certificate (root certificate) in the sequence sings the second certificate. Similarly, the n-th certificate in the sequence signs the n+1-th certificate. The last certificate in the digital certificate sequence is referred to as a "leaf certificate". With the digital certificate chain, each certificate verifies the next certificate in the root-to-leaf order. Thus, all the certificates in the chain are verified.

The "root certificate" is identical to the disc root certificate contained in the BD.ROOT.CERTIFICATE file.

The "leaf certificate" includes an organization ID. The SIG-BD.SF is stored in the format called PKCS#7, which is a file format used to store one or more signatures and digital certificates. The PKCS#7 format is described in RFC2315 published by IETF (Internet Engineering Task Force). RFC2315 is available for reference at http://www.ietf.org/rfc/rfc2315.txt.

Normally, the SIG-BD. SF contains one digital certificate chain. Yet, in the case where authorization is provided as in a later-described example, two digital certificate chains are generated. The two digital certificate chains are referred to as first and second digital certificate chains. Regarding the first digital certificate chain, the root certificate is the disc root certificate of the organization that receives the authorization ("recipient organization"), whereas the leaf certificate includes the organization ID of the recipient organization. Regarding the second digital certificate chain, the root certificate is the disc root certificate of the organization that gives the authorization ("provider organization"), whereas the leaf certificate includes the organization ID of the provider organization. In the case where no authorization is provided, the SIG-BD. RSA contains a single digital certificate chain (first digital certificate chain).

The detailed description of the manifest file, the SIG-BD. SF, and the SIG-BD. RSA is found in the specifications of Java™ archive files. The manifest file, the SIG-BD.SF, and the SIG-BD.RSA are used for the signature process and signature verification. Finally, the BD-J application, which is an instance of the class files contained in the Java™ archive file, and a permission request file 405 can be singed using digital certificates. Hereinafter, the manifest file, the SIG-BD.SF, and the SIG-BD.RSA are collectively referred to as "signatures using digital certificates".

(v) bd.XXXX.perm: Permission Request File

The bd.XXXX.perm contains information indicating what permission is given to the BD-J application to be executed. More specifically, the permission request file stores the following information:

(a) Digital Credential (Credential)

Hereinafter, a description of (a) digital credential is given. The digital credential is information used for sharing files in a specific directory belonging to a specific organization. The file sharing is enabled by giving authorization to access the files used by an application belonging to a specific organization to an application belonging to another organization. For this purpose, the digital credential includes a provider organization ID identifying the organization that gives authorization to use their applications' files and a recipient organization ID identifying the organization that receives the authorization.

FIG. 18B illustrates an example data structure of a digital credential. The digital credential is composed of a hash value 51 of a root certificate issued by a root certificate authority to the provider organization, a provider organization ID 52 assigned to the provider organization, a hash value 53 of a recipient root certificate issued by the root certificate authority to the recipient organization, a recipient organization ID 54 assigned to the recipient organization, a recipient application ID 55, and a provided file list 56. The provided file list 56 includes information indicating at least one provided file name 57 and a permitted access type 58 (read access permission or write access permission). The digital credential needs to be singed to be valid. Similarly to the SIG-BD.RSA, the digital credential may be singed in the PKCS#7 format.

FIG. 18C illustrates a specific example of a digital credential. The digital credential shown in the figure permits read access to the file "4/5/scores.txt" and write access to the file "4/5/etc/score2.txt".

Next, (b) Interprocess Communication will be described. Normally, a BD-J application included in one Java™ archive file is not permitted to communicate with any other BD-J applications included in other Java™ archive files (i.e., interprocess communication is not permitted). Yet, interprocess communication is possible if the bd.XXXX.perm indicates that such permission is given.

The digital credential needs to be singed to be valid. The digital credential may be singed in the PKCS#7 format. The PKCS#7 format is described in RFC2315 published by IETF (Internet Engineering Task Force). RFC2315 is available for reference at http://www.ietf.org/rfc/rfc2315.txt. The result of such a signature process is to be stored in the SIG-BD.SF, as a hash value of the provider root certificate.

This concludes the description of the bd.XXXX.perm. Now, root certificates are described in greater detail.

Figure 19:
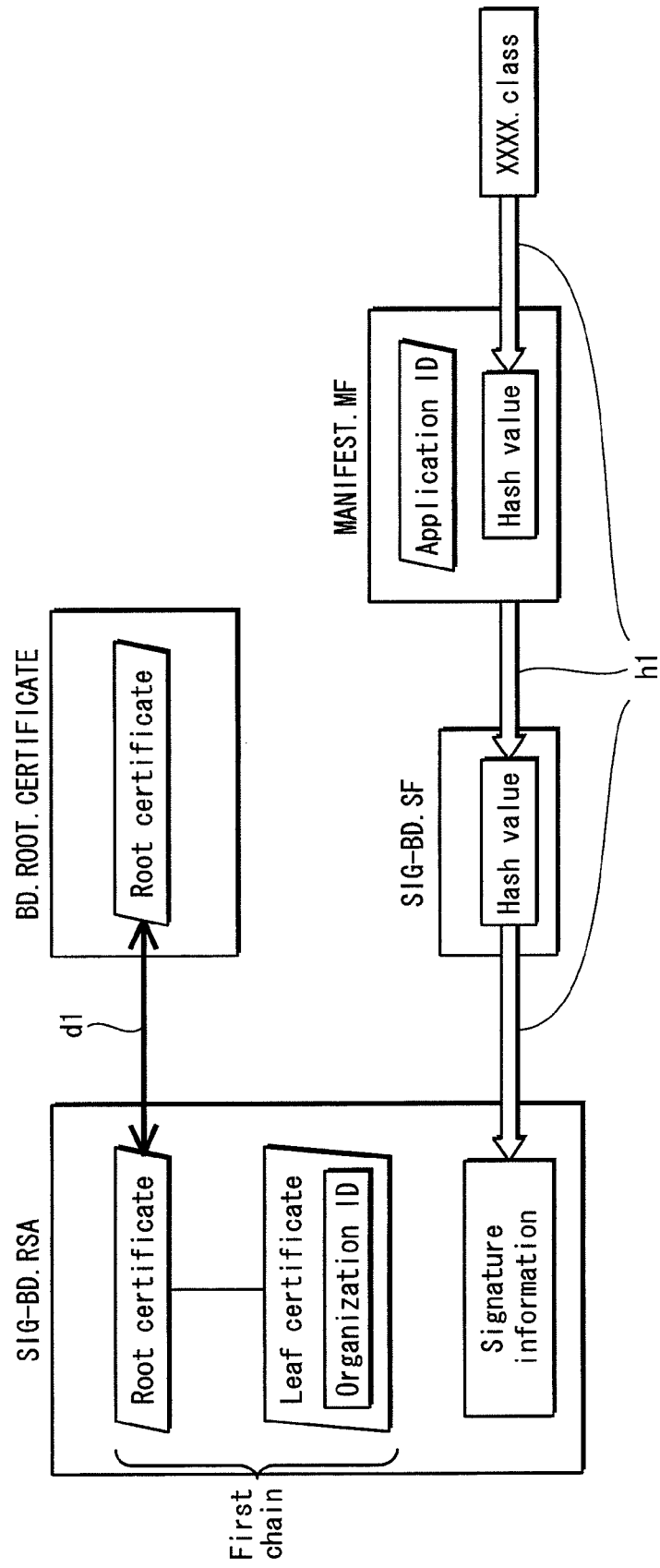
FIG. 19 shows interrelationship between SIG-BD.SF and BD.ROOT.CERTIFICATE in the case authority has not been given.

FIG. 19 illustrates the relation between the SIG-BD.SF and BD.ROOT.CERTIFICATE files, in the case where no authorization is provided. An arrow d1 in the figure illustrates that the information elements contained in the respective files are identical. In the case where no authorization is provided, the root certificate (disc root certificate) of the BD.ROOT.CERTIFICATE file is identical to the root certificate contained in the first digital certificate chain contained in the SIG-BD.RSA file.

The MANIFEST.MF contains a hash value acquired by performing the signature process on the class file XXXX.lass. The SIG-BD.SF contains a hash value acquired by performing the signature process on the MANIFEST.MF. The SIG-BD.RSA contains a hash value acquired by performing the signature process on the SIG-BD.SF (arrow h1). Thus, by verifying the hash values and checking whether the hash values are identical, the playback apparatus 102 is enabled to judge whether the Java™ archive file is valid or has been tampered. Since no authenticity is provided in this specific example, the bd.XXXX.perm file is not illustrated in the figure.

Figure 20:
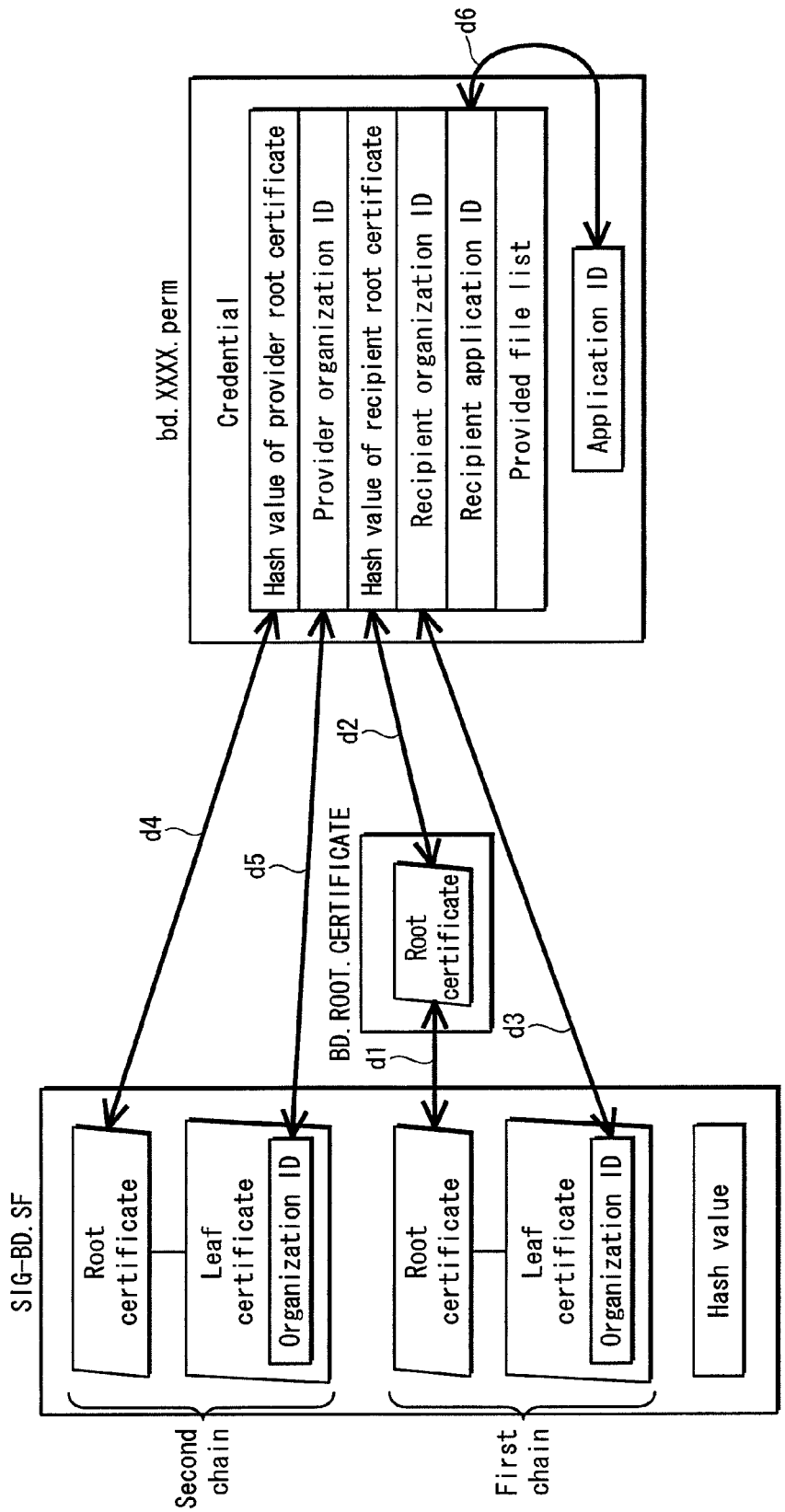
FIG. 20 shows interrelationship among SIG-BD.SF, BD.ROOT.CERTIFICATE and bd.XXXX.perm in the case authority has been given.

FIG. 20 illustrates the relation among the SIG-BD.SF, the BD.ROOT.CERTIFICATE and bd.XXXX.perm files, in the case where authorization is provided. Arrows d1-d6 in the figure connects mutually identical information elements contained in those files. Similarly to the above example, the root certificate (disc root certificate) contained in the BD.ROOT.CERTIFICATE file is identical to the root certificate of the first digital certificate chain contained in the SIG-BD.RSA file (arrow d1). Different from the above example, however, in the case where authorization is provided, the disc root certificate contained in the BD.ROOT.CERTIFICATE file is of the recipient. Thus, the root certificate contained in the BD.ROOT.CERTIFICATE is identical to the recipient root certificate in digital credential contained in the bd.XXXX.

perm file (arrow d2). In addition, the recipient organization ID in the digital credential is identical to the leaf organization ID of in the first digital certificate chain (arrow d3).

The root certificate of the provider organization included in the digital credential that is contained in the bd.XXXX.perm file is identical to the root certificate in the second digital certificate chain contained in the SIG-BD.SF file (arrow d4). Further, the provider organization ID included in the digital credential is identical to the organization ID indicated in the leaf certificate of the second digital certificate chain in the SIG-BD. SF (arrow d5). The recipient application ID included in the digital credential is identical to an application ID that is contained in the bd.XXXX.perm file but not in the digital credential (arrow d6).

The MANIFEST.MF file contains a hash value calculated from the XXXX.class file. The SIG-BD.SF file contains the hash value calculated from the MANIFEST.MF file. The SIG-BD.RSA file contains a hash value calculated from the SIG-BD.SF file (arrow h1). Thus, by verifying the signatures and checking whether the hash values are identical, the playback apparatus 102 is enabled to judge whether the Java™ archive file is valid or has been tampered. It should be noted that the present embodiment judges whether the two root certificates are identical by comparing hash values calculated from the respective root certificates to see if the two hash values match. In addition, it is a common practice that once calculated, the hash values are stored in memory or the like and supplied for further use without another calculation. The calculation of a hash value and fetching of a hash value from memory are both referred to as "acquisition" of a hash value.

Figure 21:
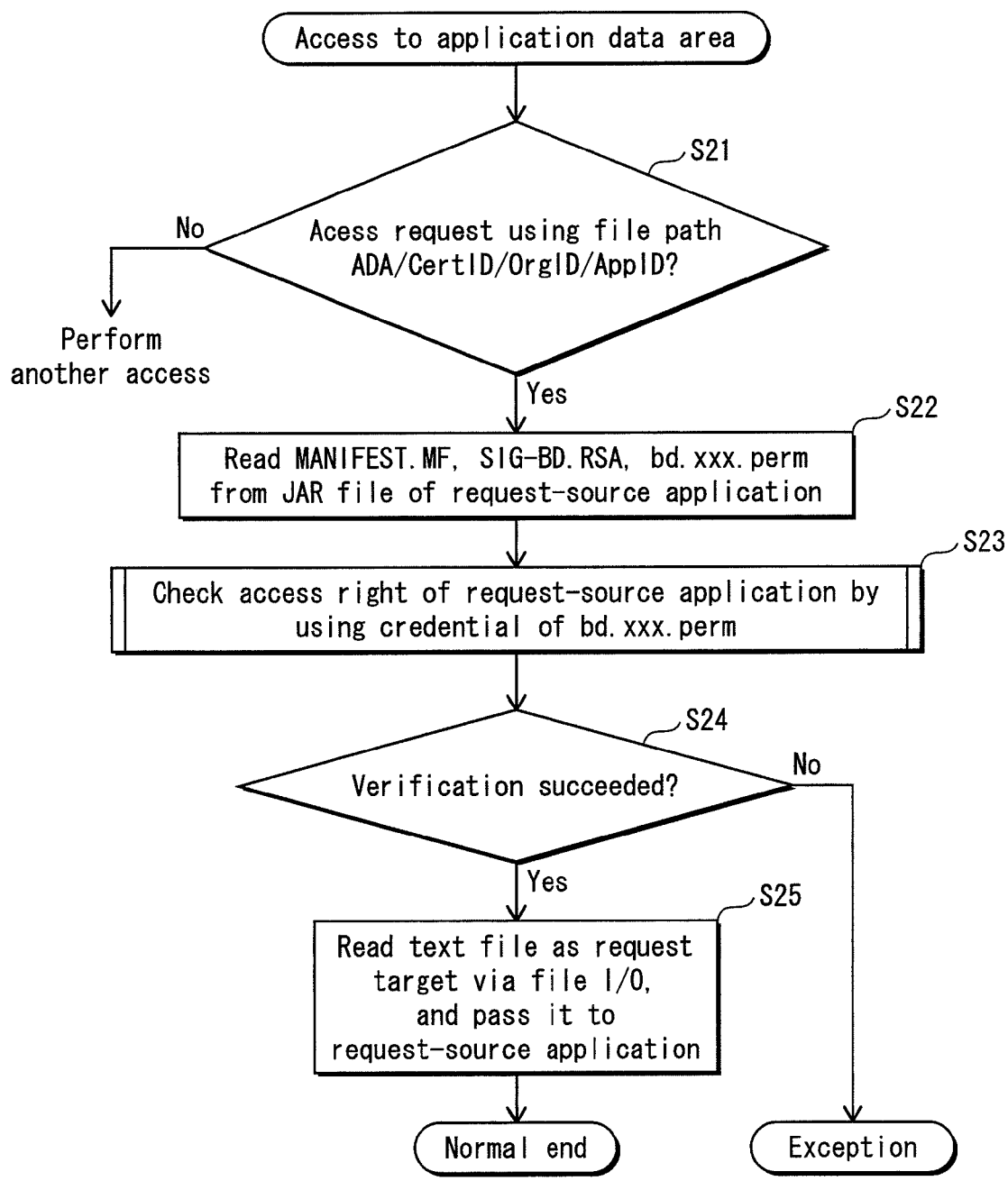
FIG. 21 is a flowchart showing procedures for accessing an application data area.

FIG. 21 is a flowchart showing processing procedures performed by a BD-J application to access the application data area.

Step S21 is for judging whether there has been the access request that uses a fixed file path represented as a combination of "ADA-Cert ID-Organization ID-Application ID". If judged affirmatively, the BD-J application executes the Steps S22 to S25. If judged negatively, operations according to the request will be performed. Steps S22 to S25 are for extracting digital credential from the archive file of the request-source BD-J application (Step S22), checking the access right of the request-source service application by using the digital credential (Step S23), and judging whether the verification has succeeded or not (Step S24). If the verification has succeeded, the text files as the request target will be read via the file I/O of the virtual file system 23, and passed to the request source BD-J application (Step S25). If the verification has failed, the request source BD-J application is not allowed to read the text files as the request target via the file I/O of the virtual file system 23, and the processing finishes as an exceptional case.

With the structure explained above, whether the access request that uses the fixed file path represented as a combination of "ADA-Cert ID-Organization ID-Application ID" has been made or not is judged. However, it is acceptable that the an access request that uses a fixed file path represented as a combination of "Organization ID-Application ID" has been made or not is judged, and in the case the verification succeeds, the file I/O of the virtual file system 23 specifies the Cert ID by using the certificate ID of the provider root certificate specified based on the digital credential, and passes to the request-source BD-J application the text files that correspond to the fixed file path represented as the combination of "ADA-Organization ID-Application ID" by using the specified Cert ID and the combination of "Organization ID-Application ID" described above.

With the stated structure, it is possible to restrict applications from accessing the request-target text files, and to increase the confidentiality level of the certificate ID (and the provider root certificate corresponding to the certificate ID or the leaf certificate).

Figure 22:
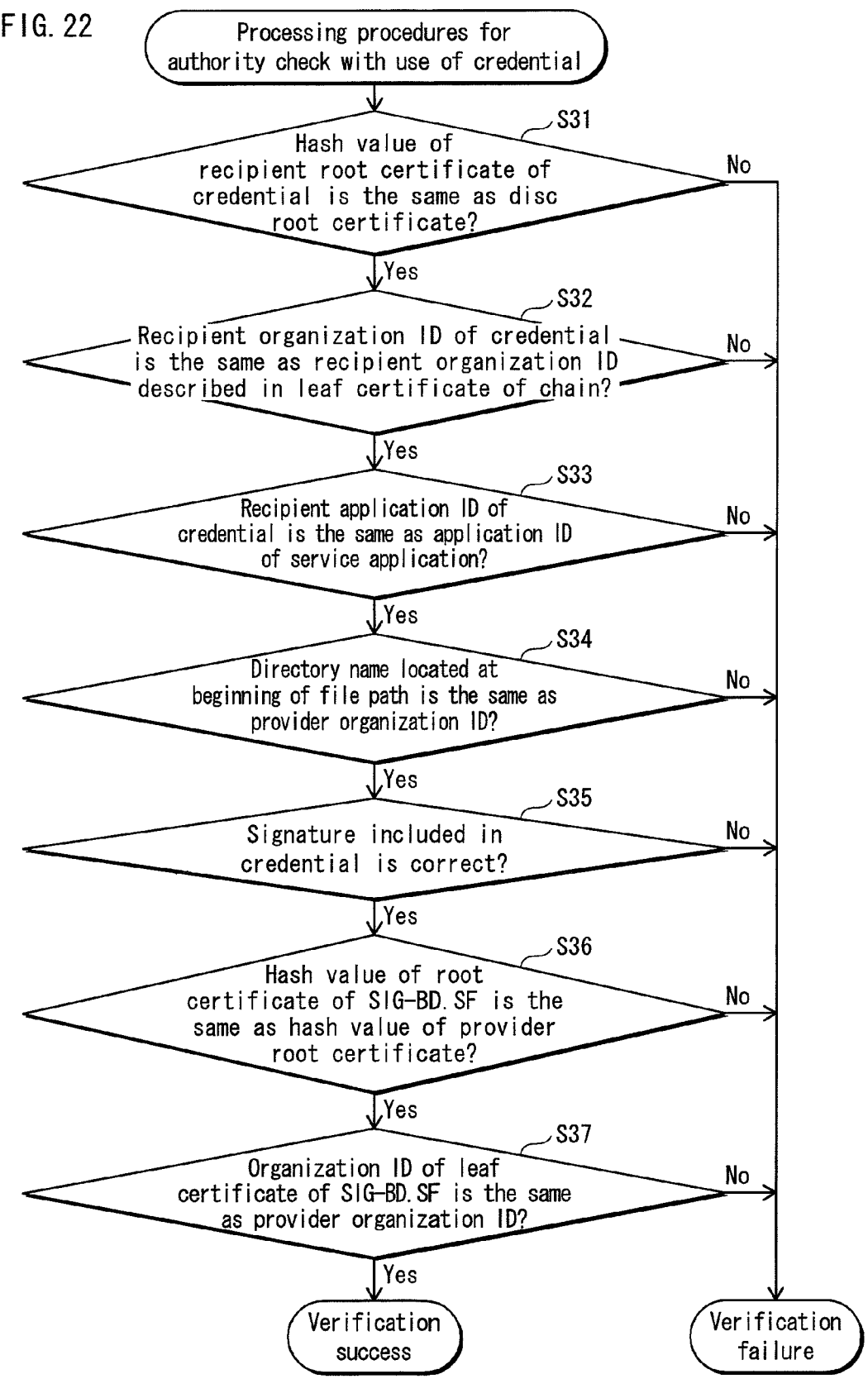
FIG. 22 is a flowchart showing processing procedures of authority check with use of the digital credential.

FIG. 22 is a flowchart showing processing procedures of authority check with use of the digital credential. In this flowchart, judgment steps S31 to S37 are sequentially performed on the service application that attempts to have access. If the result of any of the judgment steps is No, the verification result will be considered as a failure.

The following explains the details of the Steps S31 to S37.

Step S31 is performed for checking whether the hash value of the recipient root certificate of the digital credential is the same as the disc root certificate included in the BD.ROOT. CERTIFICATE of the BD-ROM.

Step S32 is performed for checking whether the recipient organization ID of the digital credential is the same as the recipient organization ID described in the leaf certificate of the chain whose root is the disc root certificate.

Step S33 is performed for checking whether the recipient application ID of the digital credential is the same as the application ID of the service application.

Step S34 is performed for checking whether the directory name located at the beginning of the file path that specifies the provided file is the same as the provider organization ID.

Step S35 is performed for checking whether the signature included in the digital credential, namely, the hash value of the provider root certificate is correct or not. This check is realized with calculation of the hash value of the digital credential and judgment on whether the obtained hash value is the same as the hash value of the provider root certificate included in the digital credential.

Step S36 is performed for checking whether the hash value of the root certificate of the SIG-BD.SF, which is the signature of the digital credential, is the same as the hash value of the provider root certificate described in the digital credential.

Step S37 is performed for checking whether the organization ID of the leaf certificate of the SIG-BD.SF, which is the signature of the digital credential, is the same as the provider organization ID described in the digital credential.

If the results of these Steps S31 to S37 are all Yes, the verification succeeds.

Through these judgment steps, if the verification of the digital credential succeeds, the service application that has made the access request will be allowed to access the benchmark scores recorded in the application data area according to the access method described in the digital credential.

In the digital credential in FIG. 14 permits access to the file that contains two types of benchmark scores, namely "4/5/scores.txt" and "4/5/scores2.txt". The certificate permits only read access to the "4/5/scores.txt" and read and write access to the "4/5/etc/scores2.txt".

In this way, by permitting the service application verified based on the digital credential to have not only read access but also write access, it is possible to execute the benchmark test without keeping the user waiting, and enable the service applications that have the digital credential to share the scores of the test.

Third Embodiment

The first embodiment reads the benchmark scores incorporated in the firmware 22 and writes the scores into the application data area. On the other hand, the second embodiment does not copy the benchmark scores incorporated in the firmware 22 into the application data area of the local storage.

Instead, the benchmark application 29 expands the scores in the memory (e.g. the RAM 15 in FIG. 7) at the startup of the firmware 22.

Such expansion is performed in the following manner, for example: Using the heap area management function, the benchmark application 29 secures a heap memory in an empty area of the memory, and writes the benchmark scores in the secured heap memory. Afterwards, the benchmark application 29 notifies the other service applications about that the benchmark scores have been written, through the interprocess communication, and enables the other service applications to use the benchmark scores in the heap memory.

Figure 23:
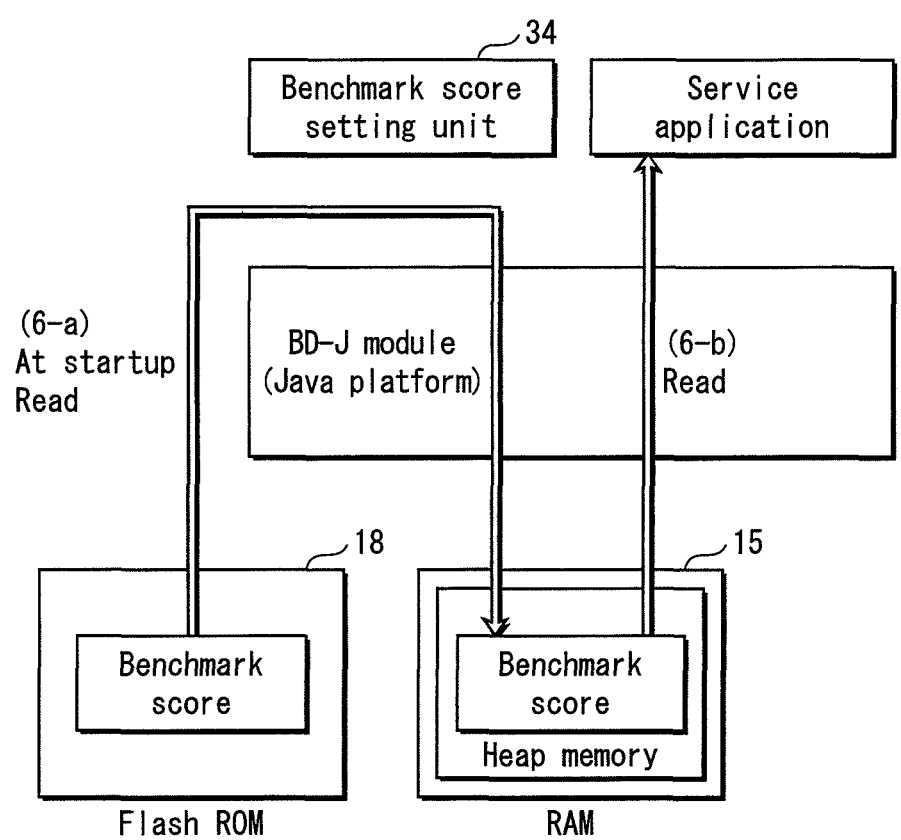
FIG. 23 schematically shows traffic of benchmark scores pertaining to the third embodiment.

FIG. 23 schematically shows traffic of the benchmark scores pertaining to the third embodiment. The arrow (6-a) schematically shows the reading of the benchmark scores from the flash ROM 18 to the heap memory in the RAM 15 at the time the playback apparatus 102 is started up. The arrow (6-b) schematically shows the reading of the benchmark scores from the RAM 15 to the service application when the service application makes the request.

Such a data flow reduces the delay time caused by the copying of the benchmark scores to the application data area in the local storage. Also, in the case the application data area is structured as an SD memory card or the like, it is possible to reduce the number of writings into the SD memory card.

In the example explained above, the benchmark scores are written into the heap memory of the RAM 15 shown in FIG. 7 for example. However, since the benchmark scores are incorporated in the firmware 22, the benchmark scores may be loaded into the resident area for the firmware 22 in the RAM 15 together with the firmware 22 at the time of loading of the firmware 22 from the flash ROM 18 when the power switch of the present apparatus is pressed and accordingly the power unit supplies the power to the MPU 16 and the devices and these pieces of hardware are started up.

Also, in the example explained above, the benchmark application 29 notifies the other service applications about that the benchmark scores have been written, through the interprocess communication, and enables the other service applications to use the benchmark scores in the heap memory. However, the structure of the present invention is not limited to such a structure. Upon writing the benchmark scores into the RAM, the benchmark application 29 may create position management information (not illustrated) that contains the recording position (e.g. address) of the benchmark scores in the RAM 15. When an application program makes a request for accessing the benchmark scores, the benchmark application 29 may read the benchmark scores in the RAM 15 according to the position management information, and pass the benchmark scores to the application program.

If this is the case, upon receipt of the file path specified by the BD-J application program, the file I/O program that realizes the Java™ I/O method described in the first embodiment refers to the position management information, and reads the benchmark scores expanded in the RAM 15, and returns the benchmark scores to the BD-J application program.

In addition to the recording position of the benchmark scores in the RAM 15, the position management information (not illustrated) may also include information showing correspondence with the original recording position (e.g. the position specified by the fixed file path represented by the combination "ADA-Cert ID-Organization ID-Application ID").

With the stated structure, even in the case the application program designates the original recording position (e.g. the position specified by the fixed file path represented by the combination "ADA-Cert ID-Organization ID-Application ID") to make a request for reading the benchmark scores, the file I/O of the virtual file system 23 of the firmware 22 can read the benchmark scores from the flash ROM 18 with reference to the position management information (not illustrated), and pass the read benchmark scores to the application program that has made the request.

As a result, it is possible to reduce the number of writings into the local storage in the case the local storage including the application data area as the original recording position (e.g. the position specified by the fixed file path represented by the combination "ADA-Cert ID-Organization ID-Application ID") has a limitation of the number or writings.

Also, it is possible to reduce the delay time caused by the copying of the benchmark scores to the application data area in the local storage. Further, in the case the application data area as the original recording position is structured from a semiconductor memory card, it is possible to reduce the number of overwritings into the semiconductor memory card.

Fourth Embodiment

In the second embodiment, in the case the new firmware 22 is provided via the removable medium, the benchmark scores in the application data area are automatically overwritten. On the other hand, the present embodiment compares the version of the benchmark scores already stored in the application data area and the version of the benchmark scores incorporated in the new firmware 22 when the firmware 22 is updated. Only in the case the benchmark scores written in the RAM 15 is newer, the benchmark scores in the new firmware 22 will be written into the application data area. Since the benchmark scores incorporated in the firmware 22 are in the form of text files, the time and date of the creation or the update of the text files may be used as the version of the benchmark scores. Alternatively, the time and date at which the benchmark is performed may be recorded in the text files, and this time and date may be used as the version of the benchmark scores.

With the stated structure, in the case the application data area as the original recording position is structured from a semiconductor memory card, it is possible to reduce the number of overwritings into the semiconductor memory card.

Fifth Embodiment

Figure 24:
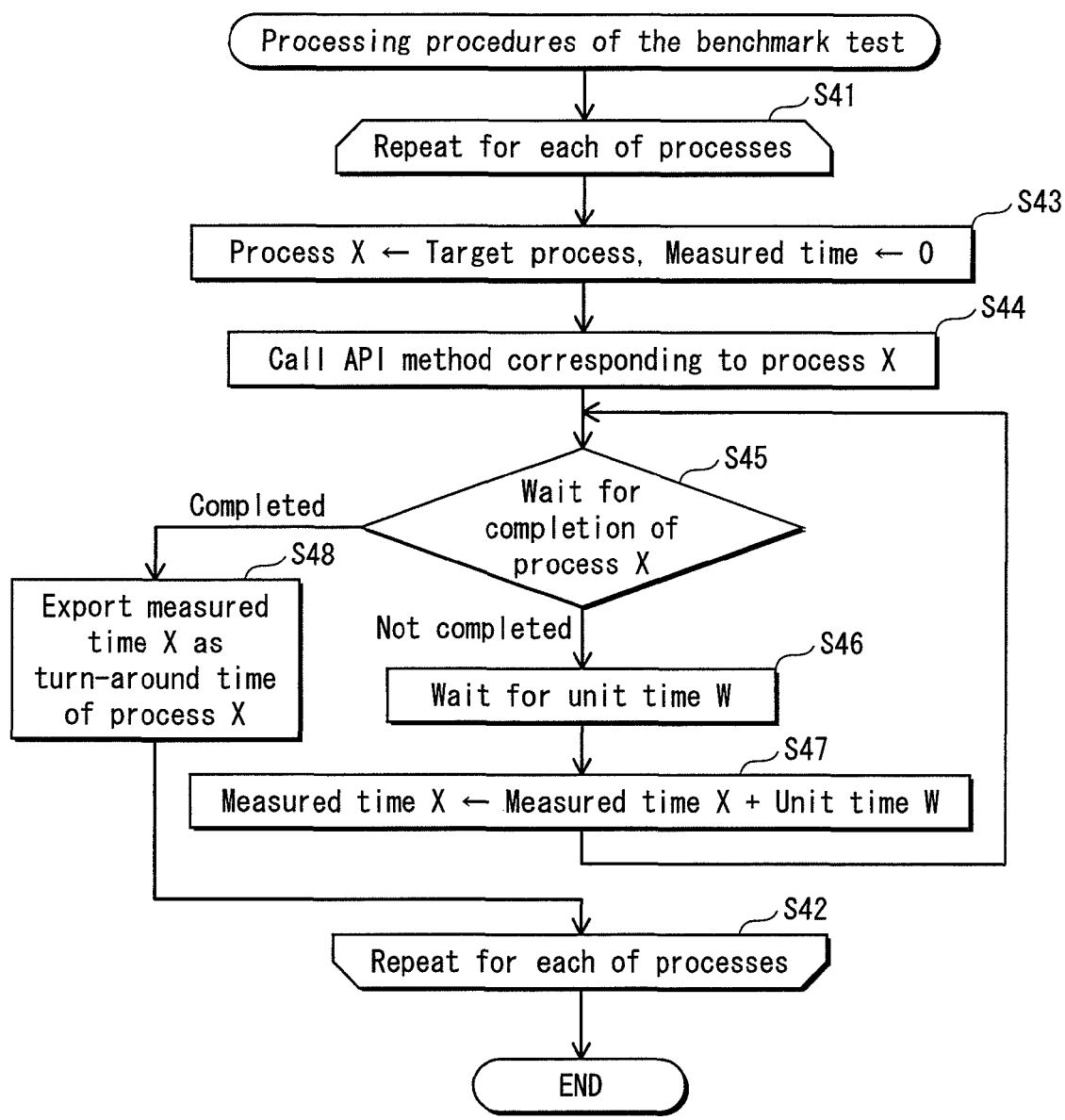
FIG. 24 is a flowchart showing processing procedures of a benchmark test performed by a benchmark application 29.

The present embodiment specifically discloses the processing procedures of the benchmark test performed by the benchmark application 29. FIG. 24 is a flowchart showing the processing procedures of the benchmark test performed by the benchmark application 29.

This flowchart has a loop structure in which Steps S43 to S48 are repeated for each of the processes performed by the hardware shown in the first embodiment.

Calls for the API methods for executing the hardware processes are described in the benchmark application 29, and Steps S43 to S48 are repeated for each of the calls for the API methods.

In the following explanation, the target process among the processes to be covered is called process X, and a measurement time, namely the turn-around time for the process X is called measurement time X. In Step S43, the benchmark application 29 determines the process X and initializes the measurement time X to be 0. In Step S44, the benchmark application 29 calls the API method for executing the process X. Specifically, the benchmark application 29 calls the API method for reading the data for benchmark score evaluation from the BD-ROM and the local storage to the RAM 15, the API method for decoding such data, and the API method for making the MPU 16 calculate a computation for the benchmark score execution.

Next, the benchmark application 29 executes the loop from Step S45 to Step S47. Step S45 is for judgment on whether the process requested with the API method call has been completed or not. If the process has not been completed, the benchmark application 29 waits for a unit time W of the turn-around time (Step S46).

The unit time W is, for example, the clock time used for the MPU 16 executing several hundreds of instructions, which is determined based on the accuracy of the turn-around times of the benchmark scores. For example, in the case the time accuracy of the turn-around times corresponds to 47 kHz, the operation clock time of the MPU 16 is smaller than the accuracy level of the turn-around time divided by several hundreds. Thus, the benchmark application 29 waits for the unit time W of the turn-around time in Step S46.

On elapse of the unit time, the benchmark application 29 adds the unit time to the measurement time X to update the measurement time X, and returns to Step S45. While the benchmark application 29 waits for the completion of the process X with repeating Steps S45 to S47, the measurement time X, the measurement time X increase by the unit time W increments.

On completion of the process X, when receiving a notification event showing the completion, the benchmark application 29 exports the measurement time X, to which the unit times W have been added, to the development computer 105, in association with an identifier of the process X. The development computer 105 acquires the benchmark score of the process X by listing the identifier of the process X and the measurement time X. Repetition of these procedures results in the text files in which the identifiers of the processes and the measurement times are listed. In such a benchmark test, the time accuracy of the benchmark scores is determined by the unit time W.

Here, the Java platform as the subject of the execution of the BD-J application is of an event driven type. In some cases, the Java platform returns a response immediately after decoding the API method and issuing an instruction to a sub-layer, even if the hardware process has not been completed. As a result, the benchmark application 29 can not perform precise time measurement for the benchmark test. To avoid this, it is preferable that an API method for the benchmark test is prepared, and the Java platform returns an event precisely at the completion of the process when this API method is called. This structure allows more precise measurement of the turn-around times.

As explained above, the present embodiment is capable of acquiring benchmark scores with the time accuracy at the certain level, due to the benchmark application 29 measuring the clock time between the calling of the API method and the completion of the requested process.

Sixth Embodiment

In this embodiment, a real time operating system (real time OS) is included in the firmware 22, as a component thereof. Real time OSs are capable of estimating the worst-case execution time. This feature is suitable for realizing the real time AV playback.

The following explains the components of the real time OS incorporated in the firmware 22. The real time OS includes a kernel, middleware, and a device driver. The kernel, the middleware, and the device driver are the components of the firmware 22.

1. Kernel

The kernel performs system call processing, handler input processing for starting up an interruption handler by using an interruption signal, and handler output processing. The kernel has a task scheduler. In the real time OS, the BD-J application, which is explained in each of the embodiments above, is handled as an "application task" by the kernel. In the real time operation system, calling of an API method by the application task is realized with use of a system call mentioned above. The task scheduler sequentially generates tasks, and the MPU is provided with the tasks and executes them. To generate the tasks, the task scheduler generates a task control block for a program to be executed, and puts the block in the waiting queue.

When the task issues the system call for the device input/output request, the kernel secures the memory block in the memory pool, and generates, within the memory block, a parameter block used for the calling. The kernel calls the device driver by using as the arguments the start address of the parameter block and the address of a device table that describes device information.

2. Middleware

The middleware includes a group of APIs (Application Programming Interfaces) for realizing the system calls. On assumption of the existence of the kernel, the middleware realizes functions of, for example, a browser, a files system, video playback and audio playback. The application can control the devices such as a decoder via the middle ware. In the real time OS, the virtual file system 23, the access control mechanism 24, the playback engine 25, the playback control engine 26 and the BD-J module 27 explained in the first embodiment are regarded as this middleware.

3. Device Driver

The device driver includes "interruption handler unit", "interruption task unit" and "request processing unit". The device driver is mapped in the system area in the memory space, and operates in the privilege mode.

The request processing unit registers the parameter block with the input/output cue, and enables interruption, and then transfers control to the kernel.

The interruption handler unit receives interruption signal from the hardware, and performs requested inputs/outputs with the devices. On completion of the scheduled inputs/outputs, the interruption handler unit disables interruption, and starts up the interruption task. If the inputs/outputs have not been completed, the interruption handler transfers control to the device driver. When another input/output request is made, the interruption handler is started up again, and the rest of the inputs/outputs will be completed.

The interruption task notifies the kernel, of the completion of the inputs/outputs by a system call that uses, as an argument, input completion information. Upon receipt of such a notification, the kernel starts up the request-source task.

In the case the calling of the API methods is realized with the system call, it is preferable that the benchmark application 29 measures each turn-around time from when the application task requests the system call to when the device executes the processing and returns a response. The manufacturer incorporates the measured times as the benchmark scores into the firmware 22.

As described above, accesses to the drive and the AV playback are realized with the system calls of the real time OS. Thus, it is possible to retain the real-time performance. As the benchmark application 29 measures the benchmark scores by using the real time OS, the benchmark scores will be accurate, based on the real-time AV playback.

Seventh Embodiment

In the explanations above, when the power switch of the apparatus is pressed and accordingly the power unit supplies the power to the MPU 16 and the devices and these pieces of hardware are started up, the firmware startup unit 31 loads the firmware 22 stored in the flash ROM 18 into a memory (e.g. the firmware resident area in the RAM 15, shown in FIG. 7) so that the MPU 16 can executes the firmware 22. However, the structure of the present invention is not limited to that. The MPU 16 may directly read the firmware 22 stored in the flash ROM 18 and execute it.

In this regard, the benchmark application 29 may notify the other service applications of the benchmark scores incorporated into the firmware stored in the flash ROM 18 through the interprocess communication, and enable the other service applications to use the benchmark scores in the flash ROM 18.

Also, the benchmark application 29 may create position management information (not illustrated) that contains the recording position (e.g. address) of the benchmark scores in the flash ROM 18. When an application program makes a request for accessing the benchmark scores, the benchmark application 29 may read the benchmark scores in the flash ROM 18 according to the position management information, and pass the benchmark scores to the application program.

In addition to the recording position of the benchmark scores in the flash ROM 18, the position management information (not illustrated) may also include information showing correspondence with the original recording position (e.g. the position specified by the fixed file path represented by the combination "ADA-Cert ID-Organization ID-Application ID").

With the stated structure, even in the case the application program designates the original recording position (e.g. the position specified by the fixed file path represented by the combination "ADA-Cert ID-Organization ID-Application ID") to make a request for reading the benchmark scores, the file I/O of the virtual file system 23 of the firmware 22 can read the benchmark scores from the flash ROM 18 with reference to the position management information (not illustrated), and pass the read benchmark scores to the application program that has made the request.

As a result, it is possible to reduce the number of writings into the local storage in the case the local storage including the application data area as the original recording position (e.g. the position specified by the fixed file path represented by the combination "ADA-Cert ID-Organization ID-Application ID") has a limitation of the number or writings.

Remarks

The present invention has been explained above based on the best mode for carrying out the invention at the time of the application. However, following technical features can be further improved or modified. It should be noted that whether to implement the present invention as shown in the embodiments above or improve/modify the present invention as follows depends on the person who carries out the invention.

File Format of the Benchmark Scores

In the first embodiment, the benchmark scores are contained in text files. However, there is a problem that the text filers are easy to read. When incorporating the benchmark scores into the firmware 22, it is preferable that the benchmark scores are contained in binary files.

Arbitrary Components of the Playback Apparatus 102

As an arbitrary component, the playback apparatus 102 may include a rendering engine. A rendering engine includes pieces of basic software, such as Java™ 2D and OPEN-GL, and renders computer graphics according to instructions from the BD-J applications, and outputs the computer graphics to the plane memory. To speed up the rendering, it is preferable that the playback apparatus 102 additionally includes a graphics accelerator as an arbitrary hardware component. Also, a coprocessor that performs floating-point operations (i.e. Floating Pointed Coprocessor) may be included.

Timing of the Verification of the Digital Credential

In the embodiments above, the analysis and the verification of the digital credential is performed when the BD-J application makes a request for accessing the benchmark scores. However, such verification of the digital credential may be performed in advance at the startup of the BD-J application, the startup of the firmware 22, and so on.

Range of the Recipient Organization

In the explanations above, it is assumed that the recipient organization is a creator of contents including service applications of the BD-ROM and so on. However, the recipient organization may be any organization as long as it signs the BD-J applications that access the benchmark scores independently from the contents creator. In such cases, the recipient organization ID is the ID number indicating the organization. In this way, it is obvious that any organization independent from the organization that creates contents can be determined as the recipient organization.

Application Range of the Devices

In the explanations above, the firmware startup unit 31, the firmware update unit 32 and the benchmark score setting unit 34 are adopted in the playback apparatus 102 that plays BD-ROMs. However, the application range of the devices is not limited to such a BD-ROM playback apparatus 102. For example, they may be applied to a playback apparatus 102 that has a recording function. If this is the case, the benchmark scores may be shared among the playback function and other functions. For example, in the case the firmware startup unit 31, the firmware update unit 32 and the benchmark score setting unit 34 are adopted in a personal computer that has the playback function, the benchmark scores under that state where the web browser and the word processor are used may be incorporated in the firmware 22.

How To Provide BD-J Applications

The incorporation and the writing of the benchmark scores explained above are applicable to any apparatuses that can display the video playback in association with execution of BD-J application. For example, they are applicable to a playback apparatus 102 to which BD-J applications that are incorporated in a broadcast wave or a network stream are provided.

Applicable Program Description Languages

In the embodiments above, the Java™ language is used as an object-oriented programming language. However, instead of the Java™ language, another programming language used in the UNIX™ OS and so on, such as B-Shell, Perl script and ECMA script may be used.

Location of the Benchmark Scores

In view of accesses from BD-J applications, the benchmark scores in the above embodiment are located in the application data area. However, the recording device for storing the benchmark scores may be realized in any form. That is, the recording device may be realized as a non-volatile recording device such as a hard disk and a flash memory, or a volatile recording device such as the DRAM 15.

Subject of Usage of the Benchmark Scores

The benchmark application 29 that use the benchmark application 29 may be downloaded from a WWW server, instead of a BD-ROM, and be written into the local storage of the playback apparatus 102. In such downloading, a root certificate that is included in the BD.ROOT.CERTIFICATE and is identical with the root certificate written as the disc root certificate is to be stored in the SIG-BD.SF and included in the Java™ archive file. As a result, also in the case the playback apparatus 102 is provided with the Java™ archive file by downloading it, the playback apparatus 102 can confirm the validity of the Java™ archive file by using the disc root certificate assigned to the BD-ROM.

BD-ROM Contents

In the embodiments above, it is assumed that the BD-J applications recorded on the BD-ROM constitutes a movie work. However, they may constitute other than a movie work as long as the applications are not those installed in the local storage for use but are to be used on the BD-ROM. For example, they may be applications that constitute game software. Also, although BD-ROMs are adopted as recording media in this embodiment, other recording media may be adopted as along as they are with copyright protection.

Also, although it is assumed that the prerecording technique is used for recording of the AV stream and the playlist information onto a BD-ROM and provided to the user, the real-time recording technique may be used for the recording and the AV stream and the playlist information may be recorded onto a BD-RE.

If this is the case, the AV stream may be a transport stream resultant from real-time encoding of analogue input signals performed by the recording apparatus, or a transport stream result from partializing of the transport stream that is input from the recording apparatus.

For the real-time recording, the recording apparatus generates, on the memory, the Clip information and the playlist information explained in the embodiments above, while recording the AV stream. After completing the recording of the AV stream, the recording apparatus writes the generated Clip information and playlist information into the recording medium. Through these operations, it is possible to allow home-use recording apparatuses and personal computers having a recording apparatus function to generate the Clip information and the playlist information explained in the embodiments above, without use of an authoring system. The generated AV stream, Clip information and playlist information may be written into a write-once type recording medium.

Time Used as Benchmark Score

In the case the service application is a client program and makes a request for processing to the server apparatus on the network, it is preferable that the benchmark score is represented as a turn-around time from when the request is made to when the processing completes and a response is returned. The processing request to the server apparatus mentioned above causes overheads in the protocol stack of the client and overheads in the protocol stack in the server apparatus. These overheads affect the turn-around time. In this way, in the case such overheads occur in the client and the server, the service application can adjust the processing load according to the amount of traffic on the network by incorporating into the firmware 22 the benchmark scores to which the effect of the overheads has been added, and writing them into the application data area.

Here, in the protocol stack, each layer has its own buffer, and copies a packet received from an upper layer to itself and adds, to the packet, data that is unique to the layer. Examples of such protocol stack are, one consisted of Socket, TCP/UDP, IP and Ethernet (IEEE 802.3), one consisted of SPX/IPX, token ring (IEEE 802.5), and one consisted of NetBEUI, FDDI/TPDDI (ANSI X3T9.5). The service applications acquire network file system information via the protocol stack so that they can accesses drives on the network in the same manner as the local drive.

Variations of the Benchmark Scores

The benchmark scores are not limited to those measured by the benchmark application 29. For example, values derived from a standard player model of the playback apparatus 102 may be adopted. In the standard player model of the playback apparatus 102, the transfer rates for transferring TS packets from the BD-ROM to the buffer are described in detail. Thus, many of the benchmark scores can be uniquely derived from the transfer rates that have been defined.

Also, the benchmark scores may be categorized into a plurality of classes, such as a class of scores unique to the manufacturer, a class of scores unique to the product and a class of standardized scores, and the service applications may use these classified scores.

Timing of Writing the Benchmark Scores

The benchmark scores incorporated in the firmware 22 may be written into the application data area every time the playback apparatus 102 is powered on and the firmware 22 is started up. As a result, it is possible to ensure that the application data area always contains benchmark scores. Although this increases the frequency of writing of the benchmark scores, the starting delay of the service application is still shorter than the case of executing the benchmark every time the application is started up.

Hash Value

Each hash value used in the present embodiment is generated by applying a secure hash function such as SHA-1 and MD5. With a secure hash function, it is practically impossible to find different data pieces that would result in the same hash value.

Root Certificate Hash Values

The hash value of a root certificate described in the present embodiment may not have to be calculated from the entire root certificate. The hash value may be calculated at least from a public key contained in the root certificate. The disc creator can explicitly select one or more secure hash functions used to calculate hash values to be contained in the MANIFEST.MF, SIG-BD.SF, SIG-BD.RSA files.

According to the present embodiment, it is always the same secure hash function that is applied to calculate the hash values 51 and 53 of the provider and recipient root certificates, respectively. Yet, it is possible that the digital credential contained in the bd.XXXX.perm file indicates a secure hash function used in the hash value calculation.

Comparison of the Root Certificates

The comparison of root certificates in Step SA05 may be made so as to judge whether the two root certificates are identical or whether public keys contained in the respective root certificates are identical. Alternatively, it is applicable to ignore the first certificate (root certificate) in the SIG-BD.RSA and to judge whether the second certificate subsequent to the root certificate is singed by the disc root certificate. In either way, it is ensured that the disc root certificate sings the second one of the digital confiscates contained in the SIG-BD.RSA. Thus, the same effect is achieved in terms of security.

An attack may be made through malicious use of interprocess communication with a BD-ROM illicitly created in the following manner.

1. A malicious hacker attempting an attack makes read access to an authentic BD-ROM created by a BD-ROM creator to fetch a Java™ archive file singed by a digital certificate. The Java™ archive file is targeted for attack.

2. The hacker creates a Java™ archive file for an attack and signs it by the digital certificate.

3. The hacker writes, onto the illicit BD-ROM, the authentic Java™ archive file targeted for attack and the illicit Java™ archive file created for making attack.

The two Java™ archive files are both singed by digital certificates but the respective root certificates are mutually different. If an playback apparatus 102 gives permission for interprocess communication to BD-J applications that are created by instantiating the respective Java™ archive files, the illicit Java™ archive file have access to the authentic Java™ archive file being the attack target. As a result, under control by the hacker, the authorized Java™ archive file ends up making unexpected processing to the memory area assigned thereto.

In order to protect against such an attack as described above, the comparison of root certificates is necessary. It is applicable that a single BD-ROM has a plurality of disc root certificates. It is applicable to prohibit interprocess communications between BD-J applications that use different root certificates. In this regard, it is applicable that a single BD-ROM has a plurality of disc root certificates 301.

Time Accuracy of the Benchmark Scores

The benchmark scores may be represented as turn-around times with time accuracy at 45 kHz level. This is because each of TS packets included in the AV stream is given an ATS (Arrival Time Stamp) having a time ATC of 27 MHz, and the playback apparatus 102 includes an ATC (Arrival Time Clock) that operates with time accuracy of $1/27,000,000$ sec. The benchmark scores created with the time accuracy for the ATC allows the processing load to be changed in synchronization with the processing of the ATS.

Implementation of the Buffer

It is preferable that the buffer shown in the embodiments above is realized as a DPRAM. A DPRAM (Dual Port RAM) has two input/output interfaces, and either of these two interfaces can be used for data read and data write. In a DPRAM, exclusive control is performed to avoid data inconsistency, with use of hardware. To obtain the benchmark scores, it is necessary to precisely evaluate the times required for the reading from and the writing to the buffer.

Implementation of the Decoders

It is preferable that each of the video decoder and the audio decoder are structured from a DSP (Digital Signal Processor). DSPs include fixed-point type DSPs and floating-point type DSPs, each equipped with a sum-of-product arithmetic unit that includes a barrel shifter, a register, a multiplier and an adder. This sum-of-product arithmetic unit realizes smoothing processing and digital signal processing at high-speed. The decoders for the compression-coded video and audio are required to perform floating-point operations with use of DCT coefficients. Thus, such DSPs are adopted as the decoders, it is possible to realize real-time AV playback. To obtain the benchmark scores, it is necessary to precisely evaluate the times required for the decoders to perform the arithmetic operations.

Implementation as a System Large-Scale Integration (LSI)

It is preferable to implement the logical device part of the hardware of the playback apparatus 102 of FIG. 7, excluding the mechanical elements (i.e. the BD drive 1, the HD drive 13 and the card drive 14) and elements to be implemented with large-size memories (the plane memory 5 for video, and the plane memory 8), as a single system LSI. This is because the logical device part can be integrated in a high density. In FIG. 7, the part to be realized as a single system LSI is illustrated in a frame. However, FIG. 7 shows only an example of the implementation as a single system LSI. The elementary buffer 7, the video decoder 4, the audio decoder 4 and the graphics decoder 6 may also be included in the single system LSI.

Generally, a system LSI is composed of a bare chip packaged on a high-density substrate. Alternatively, a system LSI may be composed of a plurality of bare chips that is packaged on a high-density substrate and has an external structure just as a single LSI (this type system LSI may be referred to also as a multi-chip module).

Focusing on the types of packaging, there are different types of system LSIs called QFP (quad flat package) and PGA (Pin Grid Array). QFP is a type of system LSI with pins extending from all four sides of the package. PGA is a type of system LSI package with an array of pins that are arranged on entire surface of the base of the package.

The pins act as an I/O interface with other circuits. Since the pins of the system LSI act as interface, by connecting other circuits to the pins, the system LSI plays a roll as the core of the application executing device.

In addition to the playback apparatus 102, such a system LSI may be incorporated into various apparatuses that is capable of playing videos, such as a TV, a game machine, a personal computer, a one-segment mobile telephone and so on, which expands the applicability of the present invention.

In the case where the elementary buffer 7, the video decoder 4, the audio decoder 4 and the graphics decoder 6 are also implemented as a single system LSI, it is preferable that the architecture of the system LSI complies with the Uniphier architecture standard.

The system LSI complies with the Uniphier architecture standard includes the following circuit blocks.

Data Parallel Processor (DPP)

This processor is an SIMD type processor in which a plural element processors operate identically. The computing units respectively included in the element processors operate at the same time according to a single instruction, so that the decoding of pixels constituting a picture is performed in parallel.

Instruction Parallel Processor (IPP)

This processor includes: "Local Memory Controller" which includes an instruction RAM, an instruction cache, a data RAM and a data cache; "Processing Unit" which includes an instruction fetch unit, a decoder, an execution unit and register files; and "Virtual Multi Processor Unit" which causes the Processing Unit to perform parallel execution of a plurality of applications.

MPU Block

This block includes peripheral circuits such as an ARM core, an external bus interface (Bus Control Unit; BCU), a DMA controller, a timer and a vector interruption controller, and peripheral interfaces such as a synchronization serial interface. The firmware 22 explained in the embodiments above is implemented as this MPU block on the system LSI.

Stream I/O Block

This block performs data input/output with a drive apparatus connected to an external bus, a hard disk drive apparatus and an SD memory card drive apparatus, via an USB interface, an ATA packet interface and so on.

AV I/O Block

This block includes an audio input/output, a video input/output and an OSD controller, and performs data input/output with an AV amplifier.

Memory Control Block

This block realizes reading/writing of SD-RAM connected via an external bus. The memory control block includes an internal bus connection unit for controlling internal connection among blocks, an access control unit which performs data transfer with the SD-RAM connected external of the system LSI, and an access schedule unit which controls requests from the blocks to access the SD-RAM 15.

The following shows detailed manufacturing procedures. First, the manufacturer creates a circuit diagram of the part to be realized as a system LSI, based on the structure diagram explained in the above embodiments, and realizes the elements shown in the diagram with circuit elements, ICs and LSIs.

After realizing the elements, the manufacturer defines a bus, which is for connecting the circuit devices, the ICs, the LSIs and so on, and their peripheral circuits, interfaces to the outside, and so on. Further, the manufacturer defines a connection lines, power source lines, grand lines, clock signal lines and so on. According to these definitions, the manufacturer adjusts operation timings of the elements and secures bandwidths required for the elements in view of the spec of the LSIs, and completes the circuit diagram.

After completing the circuit diagram, the manufacturer conducts implementation designing. Implementation designing is a substrate layout creation for determining the location on the substrate, of the parts (e.g. the circuit devices, the ICs and the LSIs) shown on the circuit diagram created by the circuit designing. Also, the implementation designing determines how to realize, on the substrate, the wiring of the circuit diagram.

When the layout on the substrate is determined as a result of the implementation designing, the manufacturer converts the result of the implementation designing to CAM data, and outputs the data to an NC machine tool or the like. The NC machine tool performs SOC implementation and SiP implementation, according to the CAM data. In a SoC (System on Chip) approach, multiple circuits are integrated on a single chip. In a SiP (System in Package) approach, multiple chips are joined into a single package with, for example, resin. Through the above processes, a system LSI according to the present invention can be produced based on the internal structure of the playback apparatus 102 referenced in the above embodiments.

Note that integrated circuits produced in the above manner may be referred to as IC, LSI, super LSI, or ultra LSI, depending on the packaging density.

It is also possible to achieve the system LSI by using the FPGA (Field Programmable Gate Array). In this case, a lot of logic elements are to be arranged lattice-like, and vertical and horizontal wires are connected based on the input/output combinations described in LUT (Look-Up Table), so that the hardware structure described in each embodiment can be realized. The LUT is stored in the SRAM. Since the contents of the SRAM are erased when the power is off, when the FPGA is used, it is necessary to define the configuration information so as to write, onto the SRAM, the LUT for realizing the hardware structure described in each embodiment.

Implementation of the Plane Memory

Since the plane memory requires a large memory size, it is not preferable to realize the plane memory with the SRAM built in the system LSI. It is preferable to realize the plane memory with an external SDRAM. Also, in the case there are a plurality of plane memories, it is preferable to adopt the bank memory method, and map the plane memories in a part of the memory space of the MPU. To obtain the benchmark scores, it is necessary to precisely evaluate the times required for the reading from and writing to the plane memories.

Target of AV Playback

The target of AV playback is not limited to the one defined for the BD-ROM, but may be any content that is composed of a digital stream, map information, and PlayList information. The digital stream is a multiplexed stream obtained by multiplexing the encoded video stream and encoded audio stream that have been encoded by the encoding method such as MPEG2 or MPEG4-AVC. The digital stream is called "VOB" in the DVD Video-Recording standard.

The map information is information that indicates relationships between the address information of the access unit (referring to a playback unit that can be decoded independently) in the above-described video stream, and the playback time on the playback time axis of the video stream. The map information is called "Time Map" in the DVD Video-Recording standard.

The PlayList information is information that defines one or more playback sections by a pair of time information as a start point and time information as an end point.

In the case of developing the playback apparatus 102 as a multi-disc support apparatus, the times required for reading the BOV from the DVD-Video and decoding it may be precisely evaluated to obtain the benchmark scores. Such benchmark scores for playback of a DVD-video may be incorporated in the firmware.

INDUSTRIAL APPLICABILITY

Since the playback apparatus pertaining to the present invention can be industrially manufactured according to the internal structure explained in the embodiments above, the present invention can be used in production industries.

The invention claimed is:

1. A playback apparatus, comprising:
hardware that includes a drive operable to read data including a benchmark program and audiovisual data from a recording medium, a player operable to play back the audiovisual data, and a processor operable to execute a firmware program for use in control of the hardware;
an initializer operable to perform initialization when the processor executes the firmware program; and
a storage having a recording area, the recording area being identified by a file path, wherein
the processor, when an application program makes a request to access a benchmark score written in the recording area, judges validity of a credential corresponding to the application program, and if the credential is valid, further judges whether to permit the application program to access the benchmark score according to access right information of the application program, which is included in the credential,
the benchmark score is included in the firmware program,
the benchmark score indicates a processing capability of the hardware and the benchmark score is a result of prescribed processing that the hardware executes according to an instruction received from the benchmark program via the firmware program,
at initial execution of the firmware program by the processor, the initializer enables the application program to access the benchmark score by writing the benchmark score created by execution of the benchmark program into the recording area of the storage, and
the initializer judges whether the recording area identified by the file path stores the benchmark score, and if the recording area does not store the benchmark score, the initializer writes the benchmark score created by execution of the benchmark program into the recording area identified by the file path.

2. The playback apparatus of claim 1, wherein
when the firmware program is updated, the initializer writes the benchmark score included in an updated firmware program into the recording area when the processor initially executes the updated firmware program.

3. The playback apparatus of claim 1, wherein
the file path includes a first identifier of a provider of the benchmark program and a second identifier of the benchmark program.

4. The playback apparatus of claim 3, wherein
the firmware program includes an input/output program that returns the benchmark score to the application program in response to an access request from the application program, and
when the application program makes the access request with a designation of the file path of the benchmark score, the input/output program returns the benchmark score based on the designation of the file path.

5. The playback apparatus of claim 4, wherein
the processor includes a first storage having a first recording area for storing the firmware program, a second storage having a second recording area for storing the firmware program loaded from the first recording area and the application program as an execution target, and a processor body that executes the firmware program and the application program stored in the second recording area.

6. The playback apparatus of claim 5, wherein
when the benchmark score included in the firmware program is loaded into the second recording area, the input/output program generates positional information that includes information of a file path of an original recording position of the benchmark score in the storage and information of an actual recording position in the second recording area into which the benchmark score is loaded, and
on receipt of the designation of the file path from the application program, the input/output program refers to the positional information, reads the benchmark score loaded in the second recording area, and returns the benchmark score to the application program.

7. The playback apparatus of claim 4, wherein
the processor includes a first storage having a first recording area for storing the firmware program, a second storage having a second recording area for storing the application program as an execution target, and a processor body that executes the firmware program stored in the first recording area and the application program stored in the second recording area.

8. The playback apparatus of claim 4, wherein
the credential includes information of the file path of the benchmark score.

9. The playback apparatus of claim 1, wherein
the application program holds a signature generated through prescribed processing performed on the credential, and
when the application program makes the request to access the benchmark score, the processor judges whether to permit the application program to access the benchmark score, based on the credential and the signature.

10. The playback apparatus of claim 3, wherein
when the firmware program is updated, the initializer compares a version of the benchmark score incorporated in an updated firmware program with a version of the benchmark score stored in the recording area, and if the version of the benchmark score incorporated in the updated firmware program is newer, the initializer writes the benchmark score included in the updated firmware program into the recording area that is identified by the file path.

11. The playback apparatus of claim 1, wherein the benchmark score is loaded into a memory and an application is allowed to use the benchmark score in the memory.

12. An integrated circuit for use in a playback apparatus, the playback apparatus being equipped with: hardware that includes a drive operable to read data including a benchmark program and audiovisual data from a recording medium, and a player operable to play back the audiovisual data; and a storage having a recording area,
the integrated circuit comprising:
a processor operable to execute a firmware program for use in control of the hardware; and
an initializer operable to perform initialization when the processor executes the firmware program, wherein
the processor, when an application program makes a request to access a benchmark score written in the recording area, judges validity of a credential corresponding to the application program, and if the credential is valid, further judges whether to permit the application program to access the benchmark score according to access right information of the application program, which is included in the credential,
the benchmark score is included in the firmware program,
the benchmark score indicates a processing capability of the hardware and the benchmark score is a result of prescribed processing that the hardware executes according to an instruction received from the benchmark program via the firmware program,
at initial execution of the firmware program by the processor, the initializer enables the application program to access the benchmark score by writing the benchmark score created by execution of the benchmark program into the recording area of the storage,
the recording area is identified by a file path, and
the initializer judges whether the recording area identified by the file path stores the benchmark score, and if the recording area does not store the benchmark score, the initializer writes the benchmark score created by execution of the benchmark program into the recording area identified by the file path.

13. A playback method for use by a playback apparatus that is equipped with:
hardware that includes a drive operable to read data including a benchmark program and audiovisual data from a recording medium, a player operable to play back the audiovisual data, and a processor operable to execute a firmware program for use in control of the hardware; and
a storage having a recording area, the storage area being identified by a file path,
the playback method comprising:
writing the benchmark score included in the firmware program into the recording area of the storage at initial execution of the firmware program by the processor; and
allowing an application program that is to be executed by the processor to access the benchmark score written in the recording area; and
when the application program makes a request to access a benchmark score written in the recording area, judging validity of a credential corresponding to the application program, and if the credential is valid, further judging whether to permit the application program to access the benchmark score according to access right information of the application program, which is included in the credential, wherein the benchmark score is included in the firmware program, the benchmark score indicates a processing capability of the hardware and the benchmark score is a result of prescribed processing that the hardware executes according to an instruction received from the benchmark program via the firmware program, at the initial execution of the firmware program by the processor, the processor enables the application program to access the benchmark score by writing the benchmark score created by execution of the benchmark program into the recording area of the storage, and the processor judges whether the recording area identified by the file path stores the benchmark score, and if the recording area does not store the benchmark score, the processor writes the benchmark score created by execution of the benchmark program into the recording area identified by the file path.

* * * * *